United States Patent [19]
Komaki et al.

[11] Patent Number: 5,790,932
[45] Date of Patent: Aug. 4, 1998

[54] IMAGE FORMING APPARATUS FOR DELAYING THE PROCESSING OF IMAGE DATA WHETHER THE IMAGE REPRESENTED BY THE IMAGE DATA IS A PREDETERMINED IMAGE

[75] Inventors: Yoshio Komaki, Yokohama; Yutaka Udagawa, Machida, both of Japan

[73] Assignee: Canon Kabushiki Kaisha, Tokyo, Japan

[21] Appl. No.: 780,358

[22] Filed: Jan. 8, 1997

Related U.S. Application Data

[62] Division of Ser. No. 209,373, Mar. 14, 1994, Pat. No. 5,621,503, which is a continuation of Ser. No. 858,072, Mar. 26, 1992, abandoned.

[30] Foreign Application Priority Data

| Mar. 29, 1991 | [JP] | Japan | 3-066903 |
| Sep. 25, 1991 | [JP] | Japan | 3-245387 |
| Sep. 30, 1991 | [JP] | Japan | 3-252217 |

[51] Int. Cl.$^6$ ............................................. G03G 21/00
[52] U.S. Cl. ............................ 399/366; 382/135; 382/165
[58] Field of Search ........................... 399/366; 283/902; 380/51; 382/135, 165

[56] References Cited

U.S. PATENT DOCUMENTS

| 4,270,146 | 5/1981 | Adachi | 358/256 |
| 4,723,129 | 2/1988 | Endo et al. | 346/1.1 |
| 4,723,149 | 2/1988 | Harada | 355/14 R |
| 4,908,873 | 3/1990 | Philibert et al. | 355/201 |
| 4,924,328 | 5/1990 | Endoh et al. | 360/60 |
| 4,985,778 | 1/1991 | Ayata et al. | 355/202 |
| 4,989,042 | 1/1991 | Muramatsu et al. | 355/202 |
| 5,216,724 | 6/1993 | Suzuki et al. | 382/7 |
| 5,227,871 | 7/1993 | Funada et al. | 358/75 |
| 5,321,470 | 6/1994 | Hasuo et al. | 355/201 |
| 5,424,807 | 6/1995 | Ohmura | 355/201 |
| 5,430,525 | 7/1995 | Ohta et al. | 355/201 |

FOREIGN PATENT DOCUMENTS

| 312301 | 4/1989 | European Pat. Off. . |
| 335232 | 10/1989 | European Pat. Off. . |
| 342060 | 11/1989 | European Pat. Off. . |
| 0382549 | 8/1990 | European Pat. Off. . |
| 65-59936 | 5/1979 | Japan . |

OTHER PUBLICATIONS

Patent Abstracts of Japan, vol. 13, No. 269 (P-888) (Kokai 1-61777), Jun. 21, 1989.

Patent Abstracts of Japan, vol. 11, No. 93 (P-559) (Kokai 61-246773), Mar. 24, 1987.

Primary Examiner—Fred L. Braun
Attorney, Agent, or Firm—Fitzpatrick, Cella, Harper & Scinto

[57] ABSTRACT

An image forming apparatus, such as a copying machine, is provided with a function of detecting in an original presented for copying, a particular image which should not be copied, for example, banknotes and other negotiable instruments. Upon detection of such image in an original presented for copying, the apparatus, in reproducing the image, synthesizes with that image a pattern denoting information which identifies the particular machine on which the copying was performed. For example, the pattern used for that purpose may be the manufacturer's serial number. In particular, the machine may binary-code input image data before synthesis with the pattern. According to another aspect, the apparatus and method of the invention discriminate the degree of similarity between input image data and the predetermined image which is not to be copied, delays the input image data during performance of the discrimination, and processes the delayed image data in a way which depends upon the degree of similarity discriminated. The discrimination of similarity may be based on the color distribution in the input image data. The structure for actually reproducing the image, whether synthesized with the serial number or not, may preferably be a bubble jet printer.

10 Claims, 20 Drawing Sheets

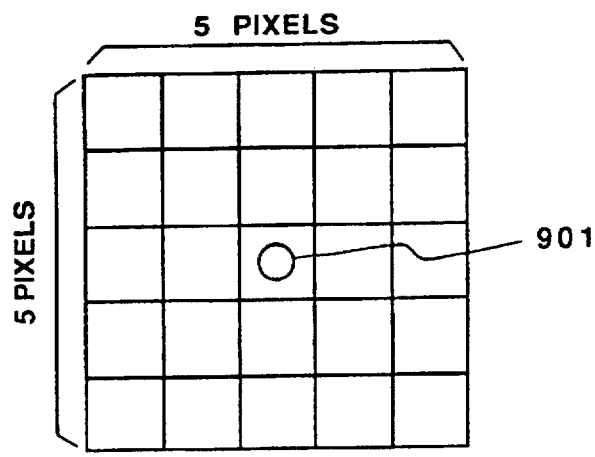
F I G. 14
| $x_1$ $y_5$ | $x_2$ $y_5$ | $x_3$ $y_5$ | $x_4$ $y_5$ | $x_5$ $y_5$ |
|---|---|---|---|---|
| $x_1$ $y_4$ | $x_2$ $y_4$ | $x_3$ $y_4$ | $x_4$ $y_4$ | $x_5$ $y_4$ |
| $x_1$ $y_3$ | $x_2$ $y_3$ | $x_3$ $y_3$ | $x_4$ $y_3$ | $x_5$ $y_3$ |
| $x_1$ $y_2$ | $x_2$ $y_2$ | $x_3$ $y_2$ | $x_4$ $y_2$ | $x_5$ $y_2$ |
| $x_1$ $y_1$ | $x_2$ $y_1$ | $x_3$ $y_1$ | $x_4$ $y_1$ | $x_5$ $y_1$ |
F I G. 15
| 1 | 1 | 2 | 1 | 1 |
|---|---|---|---|---|
| 1 | 3 | 5 | 3 | 1 |
| 2 | 5 | 9 | 5 | 2 |
| 1 | 3 | 5 | 3 | 1 |
| 1 | 1 | 2 | 1 | 1 |
F I G. 16

IMAGE FORMING APPARATUS FOR DELAYING THE PROCESSING OF IMAGE DATA WHETHER THE IMAGE REPRESENTED BY THE IMAGE DATA IS A PREDETERMINED IMAGE

This application is a division of application Ser. No. 08/209,373, filed Mar. 14, 1994, now U.S. Pat. No. 5,621,503, which is a continuation of application Ser. No. 07/858,072, filed Mar. 26, 1992, abandoned.

BACKGROUND OF THE INVENTION

1. Field of the Invention

The present invention relates to an image processing apparatus having a function of restraining people from copying a specific original document.

2. Description of the Prior Art

With recent development of color image forming apparatuses each having a device such as a CCD (solid-state imaging device) and digital color copying apparatuses such as laser beam printers or ink jet printers, reliable reproduction of multicolor original documents has been achieved, while including elements of color gradation.

However, the aforesaid conventional example encounters the problem of the danger of forgery of paper sheets or documents such as money paper, the copying of which must be inhibited. Since each of the aforesaid apparatuses has no function designed to inhibit such copying of specific original documents such as paper money, a serious problem can be foreseen if the specific original documents are copied.

As a countermeasure against such forgery, a variety of systems for use in copying machines or the like for recognizing the specific original document have been suggested. Then, description will now be described about a system such as an electrophotographic color copying machine for forming an image according to a so-called frame sequential method. In a case where an image is formed according to the frame sequential method, an original document for, for example, one image plane is read. The read data is color-decomposed, and, first, a cyan (C) component for one image plane is copied onto copying paper. Then, the same original document is again read for one image plane and, as the ensuing component, a magenta (M) component is copied, being superposed on the same copying paper. Furthermore, the aforesaid operations are repeated sequentially for a yellow (Y) component and a black (BK) component. As a result, a full color image can be formed. Therefore, if the detection of the specific original document is performed during the operation of reading the original document for three image planes and an image such as a pattern which informs that the copied paper is a forged paper is printed at the time of performing the last printing operation in black, forgery can be prevented.

However, in a so-called dot sequential type image forming apparatus in which a full color image is formed in the order of the pixels by printing images of four colors for each pixel, a portion of the specific original document has already undesirably, copied by the time the subject original document is, determined to be the specific original document. For example, if it has been detected that the subject original document is the specific original document at the time when about one-third of the original document has been copied, the forger may be able to use the copied portion of the image by veiling the portion. Therefore, a forgery cannot be prevented perfectly.

SUMMARY OF THE INVENTION

An object of the present invention is to provide an image processing apparatus capable of overcoming the aforesaid problems experienced with the conventional examples.

Another object of the present invention is to provide an image processing apparatus capable of specifying an apparatus with which copying has been performed if a specific original document such as paper money is copied, so that the results of forgery effected by copying of the specific original document can be prevented.

According to an aspect of the present invention is provided an image processing apparatus capable of perfectly preventing forgery even if an image is formed according to a dot sequential method.

Another object of the present invention is to provide an image processing apparatus comprising: discriminating means for discriminating similarity between input image data and a specific image data which has been previously prepared; pattern generating means for generating a predetermined pattern signal representing information for identifying an apparatus; synthesizing means for synthesizing said predetermined pattern signal generated by said pattern generating means and said input image data in accordance with the similarity discriminated by said discriminating means; and output means for outputting the result of synthesizing performed by said synthesizing means.

According to another aspect of the present invention is to provide an image processing apparatus comprising: input means for inputting image data; discriminating means for discriminating similarity between the image data input by said input means and specific image data; delay means for delaying the input image data during the discrimination by said discriminating means; and processing means for processing the delayed image data in accordance with the similarity discriminated by said discriminating means.

According to another aspect of the present invention is to provide an image processing apparatus having processing means for processing input image data and image forming means for forming an image in a dot sequential manner according to said processed image data comprising: discriminating means for discriminating similarity between input image data and about a specific image data prior to completion of processing of the input image data of one picture performed by said processing means.

Other objectives and advantages besides those discussed above will be apparent from the following detailed description of the preferred embodiments made with reference to the accompanying drawings and claims.

BRIEF DESCRIPTION OF THE DRAWINGS

FIGS. 14, 15 and 16 are views which illustrate a binary-to-multivalue conversion method according to the third embodiment;

DESCRIPTION OF THE PREFERRED EMBODIMENTS

Preferred embodiments of the present invention will now be described with reference to the drawings. In the descriptions about the following embodiments, the specific original document is paper money, securities and confidential documents which are the subject of forgery.

<First Embodiment>

Figure 1:
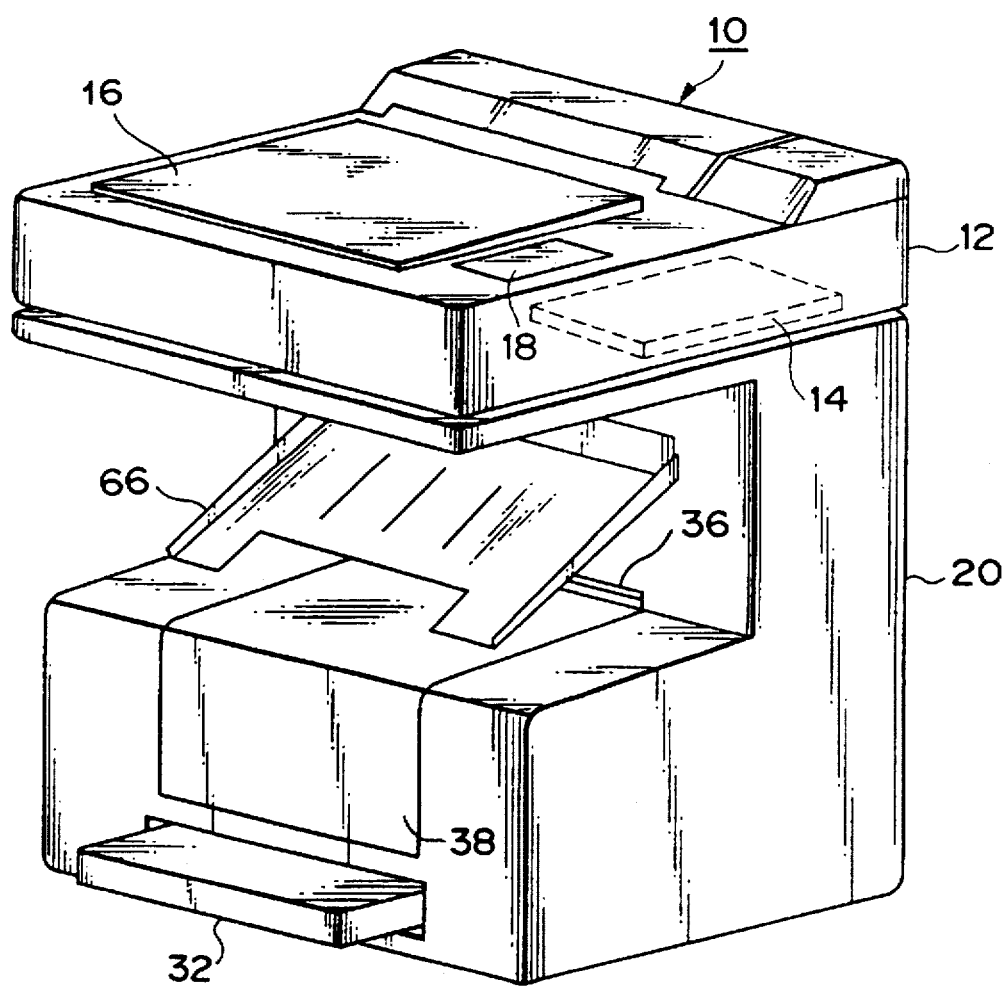
FIG. 1 is a schematic view which illustrates the shape of a digital color copying machine according to a first embodiment of the present invention.

FIG. 1 illustrates the shape of a digital color copying machine 10 according to a first embodiment of the present invention. Referring to FIG. 1, the digital color copying machine (hereinafter called a "copying machine") 10 is composed of two major portions. That is, the first major portion is a color image scanner portion (hereinafter abbreviated to a reader portion 12 for reading the image of an original document positioned above the color image scanner portion 12 and outputting digital color image data for a plurality of color components, each of which is composed of multivalue data. The reader portion 12 performs variable image processing operations such as a binarization of the digital color image data and includes a controller portion 14 having a processing function such as interfacing with external equipment.

The second major portion is a printer portion 20 disposed below the reader portion 12 to record a binary color digital image signal for each of Y (yellow), M (magenta), C (cyan) and BK (black) output from the control portion 14 of the reader portion 12 on the recording paper.

The reader portion 12 further includes a mechanism disposed therein for the purpose of reading image information from an original document placed face-down on an original document holder (omitted from illustration) disposed below an original document retaining plate 16, the original document being formed variously in terms of the shape and the size, that is the original document is formed into a stereoscopic shape, a sheet shape or a large size sheet shape.

The reader portion 12 has, an end portion of the top surface thereof, an operation portion 18 connected to the controller portion 14. The operation portion 18 has keys for inputting various information for use in the copying machine and information about the operation command, switches and a display portion for displaying menus and messages about the state of the operation.

Furthermore, the controller portion 14 is constituted to instruct the operations of the reader portion 12 and the printer portion 20 according to information supplied via the operation portion 18. For example, if a complicated editorial operation is required, a digitizer or the like is mounted in place of the original document retaining plate 16 and is connected to the controller portion 14 for the purpose of enabling further advanced image processing to be performed.

The printer portion 20 according to this embodiment is able to use a full-color ink jet printer having a ink bubble jet recording type recording head arranged as disclosed in Japanese Patent Laid-Open No. 54-59936, the ink jet printer as disclosed above being arranged to act according to the bubble jet recording method which is that of the ink bubble jet recording system. The bubble jet recording system uses a head of a type for discharging liquid droplets by utilizing film boiling brought about by heat energy.

The aforesaid two major portions can be separated from each other and can be disposed away from each other while connected to each other by a connection cable.

The aforesaid major portions will now be described.

Figure 2:
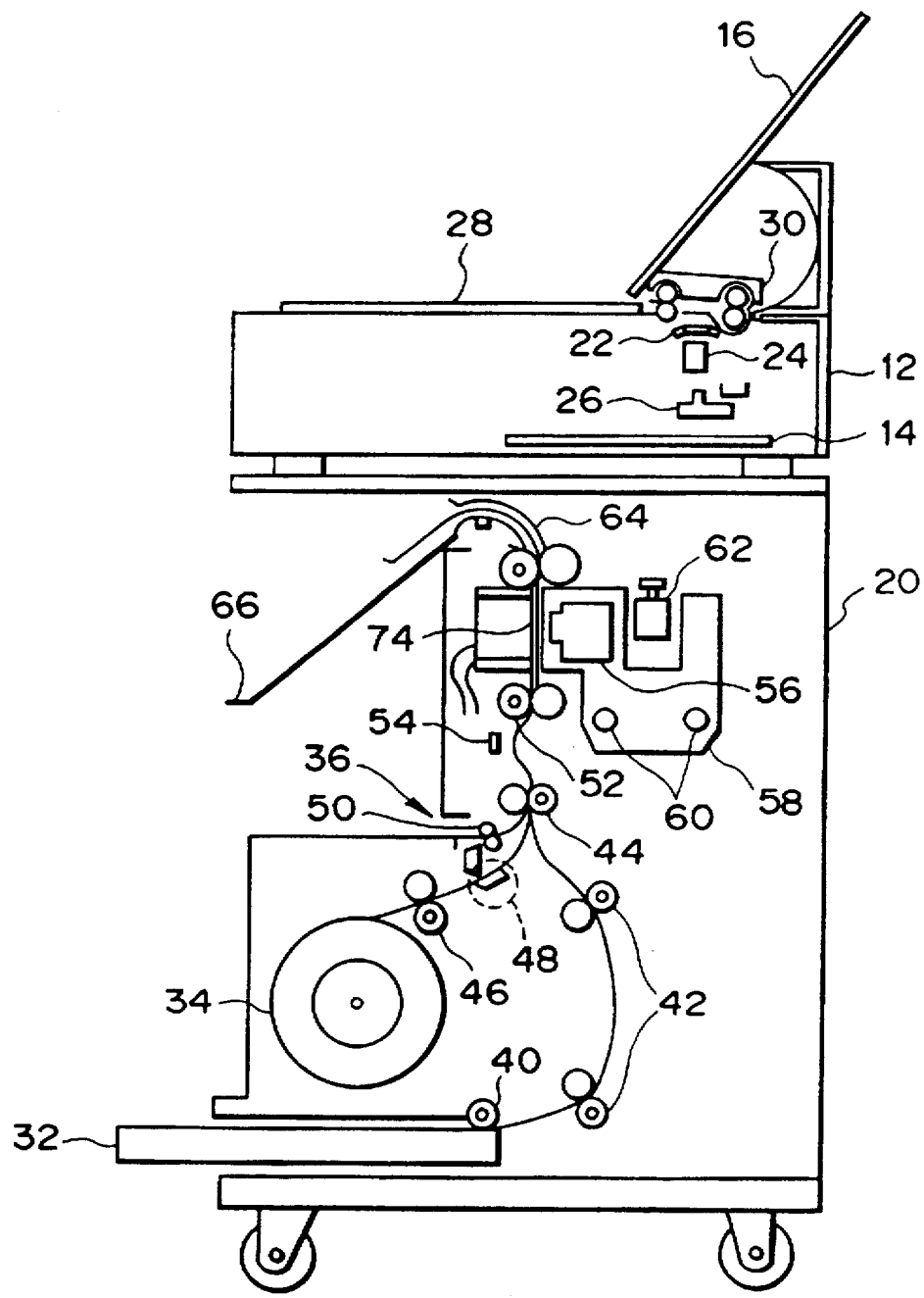
FIG. 2 is a cross-sectional view which schematically illustrates the internal structure of the copying machine 10shown in FIG. 1 when viewed from a side position.

FIG. 2 is a cross sectional view which schematically illustrates the internal structure of the copying machine 10 shown in FIG. 1 when viewed from a side position.

(Reader Portion 12)

First, the structure of the reader portion 12 of the copying machine 10 will be described.

The reader portion 12 has an exposure lamp 22, a lens 24 and an image sensor 26 (a CCD sensor according to this embodiment), which is capable of full-color reading a line image, to read the image of an original document placed on an original document retainer glass 28, or projected image formed by a projector of a sheet-like original document fed by a sheet feeding mechanism 30.

Then, image information thus read by the reader portion 12 is subjected to a variety of processes in the reader portion 12 and the controller portion 14. Then, information, which has been read and processed, is supplied to the printer portion 20 in which it is recorded to the recording paper.

(Printer Portion 20)

In the printer portion 20, the recording paper is selectively supplied, i.e. small regular size (A4 to A3 size according to this embodiment) cut-sheets accommodated in a paper feeding cassette 32 or a paper roll 34 for recording information on large size (A2 to A1 size according to this embodiment) recording paper is selectively supplied.

The paper feeding operation is commenced in response to a command to start printing supplied from the controller portion 14. Thus, the recording paper is conveyed to a position, at which first paper feeding rollers 44 are located, through the following passage. According to this embodiment, the recording paper can be supplied manually (supplied from outside the apparatus) by sequentially supplying the same through a manual feeding portion 36 along a cover for the paper feeding portion.

In a case where the recording paper is fed from the paper feeding cassette 32 loaded in the printer portion 20, a pickup roller 40 is brought into a position on the top surface of an end portion of the recording paper set in the paper feeding cassette 32, the pickup roller 40 being used to sequentially pick up the cut-sheets from the paper feeding cassette 32. Therefore, when the pickup roller 40 is rotated, the recording paper placed at the uppermost position in the paper feeding cassette 32 is picked up and is fed to cut paper feeding rollers 42. Then, the recording paper is conveyed to the first paper feeding rollers 44 by the cut-sheet feeding rollers 42.

In a case of the paper roll 34, it is continuously fed by the action of paper roll feeding rollers 46 and is cut to a regular length, the cut-sheet being then conveyed to the position at which the aforesaid first paper feeding rollers 44 are located. In a case where the recording paper is manually fed through the manual feeding port 36, the recording paper, which has been fed manually, is conveyed to the first paper feeding rollers 44 by manual feeding rollers 50.

The pickup rollers 40, the cut-sheet feeding rollers 42, the paper roll feeding rollers 46, the first paper feeding rollers 44 and the manual feeding rollers 50 are driven by a paper feeding motor (a DC servo motor according to this embodiment and omitted from illustration) in such a manner that their rotations can be turned on/off by the actions of electromagnetic clutches respectively provided for the aforesaid rollers.

The recording paper thus selected and fed through either of the aforesaid paper feeding passages is conveyed to the first paper feeding rollers 44. In order to prevent a skewing of the recording a paper loop of predetermined size in the recording paper is formed and the first paper feeding rollers 44 are turned on to rotate. Then, second paper feeding rollers 52 convey the recording paper.

Furthermore, the recording paper is slackened to form a buffer between the first paper feeding rollers 44 and the second paper feeding rollers 52 by slackening the recording paper by a predetermined quantity in order to accurately feed the recording paper between paper feeding rollers 64 disposed above a recording head 56 and the second paper feeding rollers 52 disposed below the same. In order to detect the quantity of the buffer formed by the recording paper, a buffer quantity detection sensor 54 is disposed adjacent to the position at which the buffer is formed. Since the buffer of the recording paper is always formed during its conveyance, the load which acts on the paper feeding rollers 64 and the second paper feeding rollers 52 when large size recording paper is conveyed can be reduced, so that an accurate paper feeding operation can be performed.

When printing is performed in the printer portion 20, in which the system for conveying the recording paper is formed, by using the recording head 56, a scanning carriage 58, on which the recording head 56 is mounted, is reciprocated by a scanning motor 62 on a carriage rail 60 in a direction perpendicularly to the surface of the accompanying drawing sheet, and thereby scanning of the recording paper in the main scanning direction is performed. In the forward directional scanning operation, an image is printed onto the recording paper by the recording head 56, while a sub-scanning directional feeding operation, in which the recording paper is fed by a predetermined quantity by the paper feeding rollers 64, is performed during the return scan operation.

The quantity of feeding in the sub-scanning direction is defined as a "constant quantity of movement" to be described below and is set to a length which corresponds to the width of the recording head 56 in the sub-scanning direction, that is, a length which corresponds to the width of a suction hole (omitted from illustration) formed in a platen 74 at a position at which it confronts the recording head 56. The aforesaid suction hole acts to bring the recording paper into contact with the platen 74 in a hermetic manner.

In the operation of controlling the recording paper performed by the scanning motor 62 at the time of the returning directional scanning operation, a predetermined quantity of the buffer is always maintained while detecting the quantity of the buffer by the buffer quantity detection sensor 54.

The recording paper on which information has been printed is discharged onto a paper discharge tray 66. Thus, the aforesaid sequential printing operation is completed.

(Structure of Scanning Carriage System)

Figure 3:
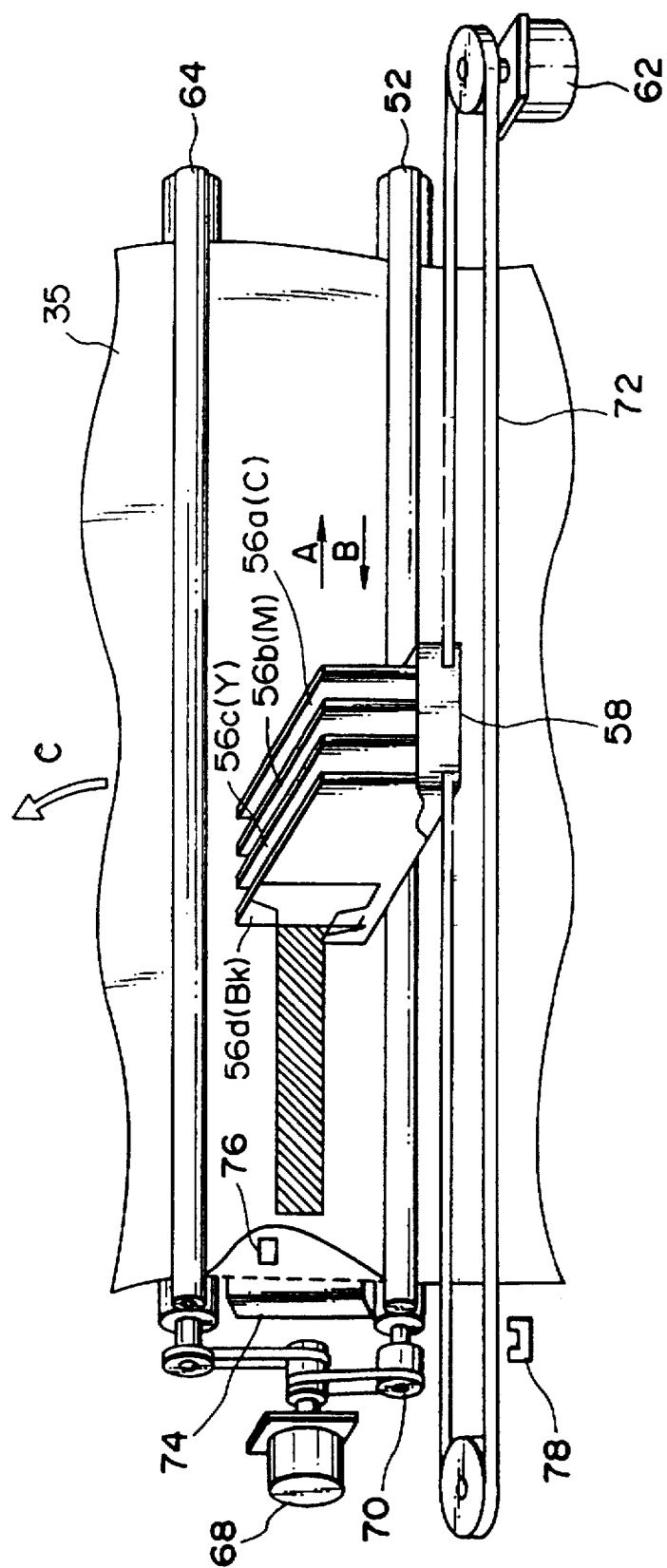
FIG. 3 is a view which illustrates the structure around a scanning carriage 58 according to the first embodiment.

FIG. 3 illustrates the structure of a portion in the vicinity of the scanning carriage 58 according to the first embodiment.

Referring to FIG. 3, reference numeral 68 represents a paper feeding motor serving as a driving power source for intermittently feeding the recording paper 35 in the subscanning direction. The quantity of the rotation of the paper feeding motor 68 can be changed to an arbitrary value so as to drive the second paper feeding rollers 52 via the paper feeding rollers and a clutch 70 for the second paper feeding rollers 52.

The scanning motor 62 serves as the driving power source for reciprocating the scanning carriage 58 via a scanning belt 72 in the main scanning direction, designated by arrows A and B. Since the paper feeding operation must be accurately controlled in this embodiment while establishing an arbitrary quantity of feeding, the paper feeding motor 68 and the scanning motor 62 are pulse motors.

In the structure according to this embodiment, a paper retaining member (omitted from illustration) is disposed at a position at which it confronts the lower end portion of the platen 74. The paper retaining member secures the recording paper 35 to the platen 74 during the scanning operation performed by the scanning carriage 58 in order to prevent deviation of the recording paper 35 such as an undesirable movement. When the recording paper 35 reaches the second paper feeding rollers 52, the clutch 70 for the second paper feeding rollers 52 and the paper feeding motor 68 are respectively turned on. As a result, the leading portion of the recording paper 35 is conveyed on the platen 74 until it is held by the pair of the paper feeding rollers 64. The platen 74 has a paper detection sensor 76 disposed thereon. The recording paper 35 conveyed on the platen 74 is detected by the paper detection sensor 76. Information obtained by the paper detection sensor 76 is utilized to control the position and to prevent a jam and the like.

When the leading portion of the recording paper 35 reaches the paper feeding roller 64, the clutch 70 for the second paper feeding rollers 52 and the paper feeding motor 68 are respectively turned off. As a result, the pressure of the space in the platen 74 is lowered to a negative level by the commencement of the action of the suction motor (omitted from illustration), so that a suction operation is commenced. As a result of this suction operation, the recording paper 35 is brought into contact with the surface of the platen in a hermetical manner. Simultaneously, the aforesaid paper retaining member secures the recording paper 35 to the platen 74.

Prior to performing the operation of printing an image onto the recording paper 35, the scanning carriage 58 is moved to a position at which a home position sensor 78 is disposed, so that the forward scanning operation is performed in the direction designated by the arrow A. In this forward scanning operation, ink for cyan (C), that for magenta (M), that for yellow (Y) and that for black (BK) are respectively discharged from recording heads 56a, 56b, 56c and 56d from predetermined positions, so that an image is recorded (printed). When an operation of recording the image by a predetermined length in the main scanning direction has been completed, the direction of the rotation of the scanning motor 62 is reversed to move the scanning carriage 58 in the reverse direction, that is in the direction designated by the arrow B, to commence the returning directional scanning operation. The scanning motor 62 is rotated reversely until the scanning carriage 58 returns to the position at which the home position sensor 78 is located.

During the aforesaid returning directional scanning operation, the rotation of the paper feeding motor 68 is commenced to rotate the paper feeding rollers 64, so that the paper feeding operation by a length (the width of one recording head) recorded by the recording heads 56a, 56b, 56c and 56d in a sub-scanning direction designated by an arrow C is performed.

According to this embodiment, the quantity of feeding the recording paper, that is the quantity of the movement in the sub-scanning direction is not limited to a constant quantity of the aforesaid movement of the width of one recording head but it may be set to the quantity of the one-way movement defined by the final line width.

According to this embodiment, the recording head 56 is an ink jet nozzle unit formed by assembling 256 nozzles for each of Y, M, C and BK.

When the scanning carriage 58 is stopped at a home position defined by the home position sensor 78, an operation of recovering the recording head 56 is performed. The aforesaid recovery operation is performed to stabilize the recording operation by preventing irregular discharge at the start of the recording operation due to change in the viscosity of ink left of the nozzle in the recording head 56. In this recovery operation, pressure is applied to each nozzle in the recording head 56 according to previously programmed conditions such as the time in which the recording paper is fed, the temperature in the apparatus and the time at which the discharge is commenced and the like to perform an idle discharge of ink from each nozzle.

By repeating the aforesaid operations, a desired image can be recorded to the entire surface of the recording paper 35.

(Structure of the System)

Then, the operations of processing the image signal and controlling the same performed in the control system of the copying machine 10 according to this embodiment will now be described with reference to FIG. 4.

Figure 4:
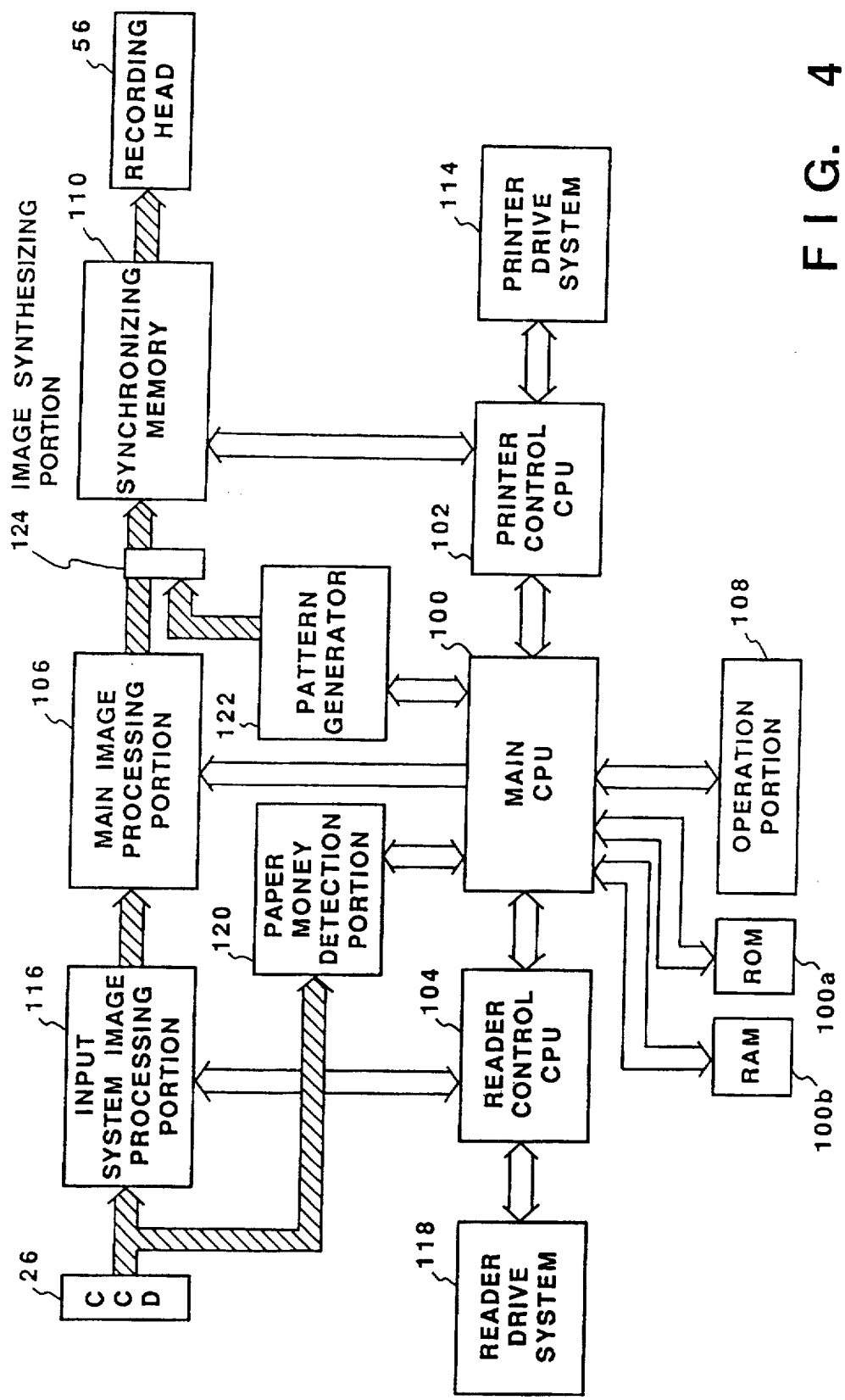
FIG. 4 is a block diagram which illustrates the structure of a control system in the copying machine 10 according to the first embodiment.

Referring to FIG. 4, reference numeral 100 represents a main CPU which controls the overall operation of the apparatus and to which the following units are connected: a printer control CPU 102 for controlling the operation of the printer, a reader control CPU 104 for controlling the reading operation, a main image processing portion 106 for displaying an image, an operation portion 108 serving as an input portion used by an operator, a money paper detection portion 120 for detecting whether or not the image of paper money is present in the original document and a pattern generator 122 for generating an image signal denoting the manufacturer's serial number of this apparatus. The main CPU 100 is also connected to a ROM 100a which stores a program or the like according to its flow chart shown in FIG. 5 and a RAM 100b for use as a work area in which a variety of programs are executed.

The printer control CPU 102 and the reader control CPU 104 respectively control the printer portion and the reader portion and are set as slaves with respect to the main CPU 100 serving as a master.

The aforesaid main image processing portion 106 performs edge highlight smoothing, masking, black extraction and trimming operations and the like and binary-codes the image signal by making a comparison with the slice level. A synchronizing memory 110 is connected to the printer control CPU 102 and, via an image synthesizing portion 124, to the main image processing portion 106. The synchronizing memory 110 performs an operation of absorbing scattering of the input operation time and an operation of correcting delays due to the mechanical configuration of the aforesaid recording heads. The output of the synchronizing memory 110 is connected to the recording head 56.

The printer control CPU 102 is connected to a printer portion drive system 114 for controlling the input operation to the printer portion.

The reader control CPU 104 is connected to an input system image processing portion 116 for performing correction processes such as a shading correction, a color correction and a γ correction operations required for the reading system and a reader portion drive system 118 for controlling the input to the reader portion.

Furthermore, the CCD line sensor 26 is connected to the input system image processing portion 116 which is connected to the main image processing portion 106.

The paper money detection portion 120 is connected to the CCD line sensor 26 and the main CPU 100 so as to discriminate whether or not paper money or the like is included in the original document in response to a multi-value image signal for each color supplied from the CCD line sensor 26. If it is discriminated that paper money is included in the original document by the paper money detection portion 120, a routine of recording the manufacturer's serial number is commenced to start the pattern generator 122. The method of discrimination is set out below with reference to FIG. 13.

The pattern generator 122 is connected to the main CPU 100 and the image synthesizing portion 124 to generate the manufacturer's serial number recorded in the ROM 100a in response to a command issued from the main CPU 100 so as to output it to the image synthesizing portion 124. The image synthesizing portion 124 is connected to the main image processing portion 106, the pattern generator 122 and the synchronizing memory 110 so as to synthesize the binary-coded image signal supplied from the main image processing portion 110 and a signal supplied from the pattern generator 122, the synthesized signal being then output to the synchronizing memory 110.

The reader portion 12 is formed by the main CPU 100, the reader control CPU 104, the main image processing portion 106, the operation portion 108, the input system image processing portion 116, the paper money detection portion 120, the pattern generator 122, the reader portion drive system 118 and the CCD line sensor 26 serving as the image sensor. The printer portion 20 is formed by the printer control CPU 102, the synchronizing memory 110, the recording head 56 and the printer portion drive system 114.

Then, the manufacturer's serial number recording routine commenced at the time of detection of paper money and executed by the main CPU 100 will now be described in detail with reference to a flow chart shown in FIG. 5.

Figure 5:
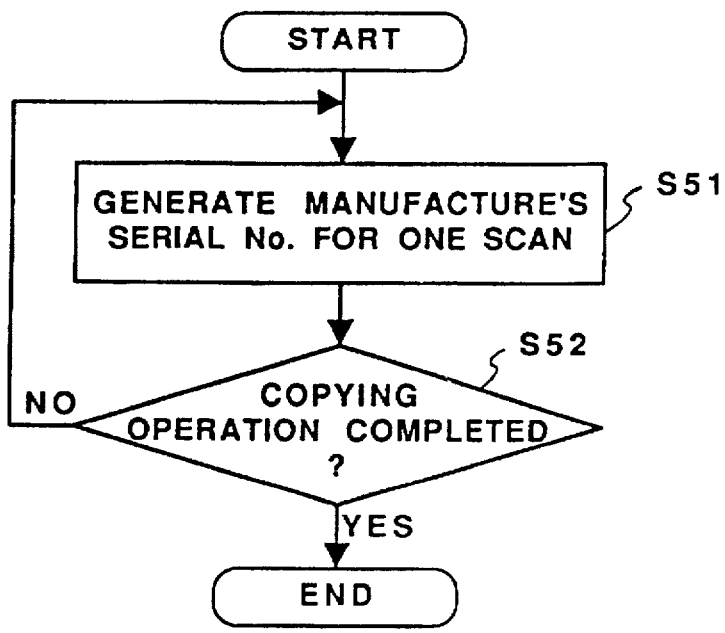
FIG. 5 is a flow chart which illustrates an example of a routine for recording a manufacturer's serial number to be executed by a main CPU 100 according to the first embodiment.

In a case where a discrimination is, by the paper money detection portion 120, made that an image of paper money or the like is included in the output signal output from the CCD 26, the manufacturer's serial number recording routine is commenced and thereby the operation of the main CPU 100 proceeds to step 51 shown in FIG. 5.

In step S51, a signal denoting the manufacturer's serial number for one scan is generated so as to be synthesized with the binary signal generated by the main image processing portion 106.

In next step S52, a discrimination is made whether or not the copying operation has been completed. If the copying operation is being executed, the flow proceeds to S51. If the copying operation has been completed, the manufacturer's serial number recording routine is completed here.

Figure 6:
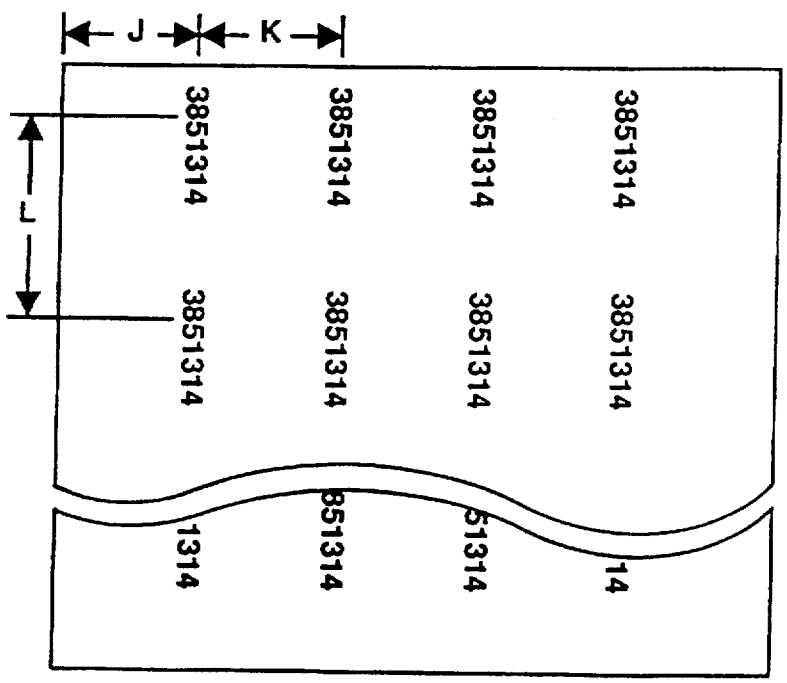
FIG. 6 is a view which illustrates an example of recording of the manufacturer's serial number according to the first embodiment.

FIG. 6 illustrates an example of an operation of recording the manufacturer's serial number according to the first embodiment. FIG. 6 illustrates an example in which manufacturer's serial number "3851314" is recorded. It is premised that the length of the short side of paper money, which is the specific original document, is longer than any one of the marginal lengths J, K and L in the main scanning direction and the sub-scanning direction when the manufacturer's serial number is recorded. As a result, even if the image of paper money is formed on the recording paper, the manufacturer's serial number can be read on the recorded image of the paper money.

According to this embodiment, the manufacturer's serial number is printed and recorded with a yellow component because it cannot easily be recognized by human eyes. The color is not limited to this and it may, of course, be half-tone color or may be formed by multi-color printing.

According to this embodiment, a manufacturer's serial number signal denoting the manufacturer's serial number is generated in the pattern generator 122 in response to a signal detected by the paper money detection portion 120. Then, the manufacturer's serial number signal and the binary-coded image signal are synthesized by the image synthesizing portion 124, a synthesized image signal being used to form an image. As a result, the apparatus used to copy paper money can be detected from the image of the specific original document recorded on the recording paper, for example, the image of paper money. Consequently, the forgery of money paper can be prevented and it is expected that suffering of it can be prevented.

<Second Embodiment>

Then, a second embodiment of the present invention will now be described. According to the first embodiment, if the image denoting the specific original document such as paper money is detected, the pattern generator continues to generate the manufacturer's serial number signal until the copying operation is completed. However, the present invention is not limited to this. For example, a structure may be employed in which, if an image denoting a specific original document such as paper money is detected by the paper money detection portion, the pattern generator commences to synthesize the manufacturer's serial number with the binary-coded image signal and if nothing is detected, the pattern generator is stopped.

Figure 7:
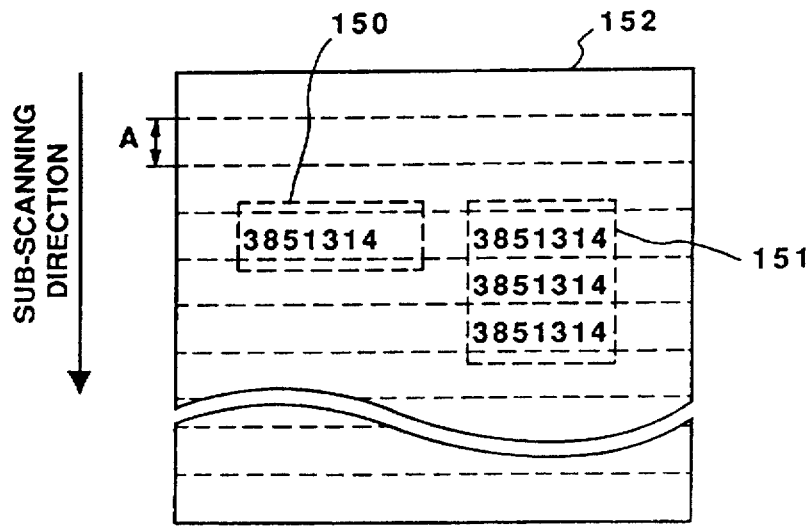
FIG. 7 is a view which illustrates an example of recording of the manufacturer's serial number according to the second embodiment.

An example of the printed image resulting in the aforesaid case is shown in FIG. 7. Referring to FIG. 7, reference numerals 150 and 151 represent paper money and 152 represents the recording paper. The paper money 150 and 151 are placed in the recording paper 152 as designated by a dashed line shown in FIG. 7. Symbol A denotes the length of the image in the sub-scanning direction formed by one scanning operation.

The routine for recording the manufacturer's serial number in a case shown in FIG. 7 will now be described.

Figure 8:
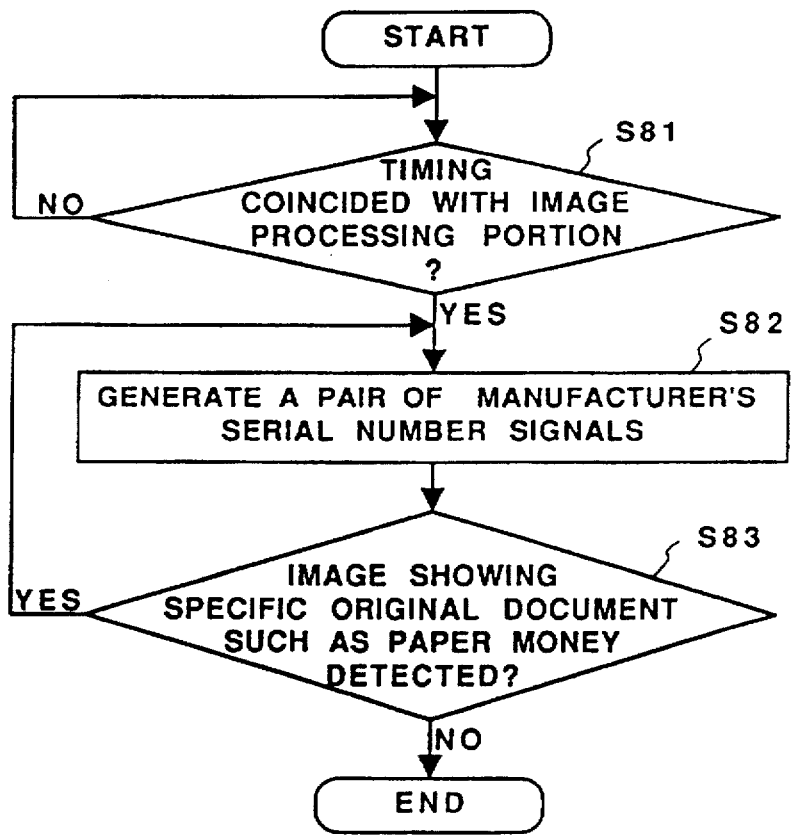
FIG. 8 is a flow chart which illustrates an example of a routine for recording a manufacturer's serial number to be executed by a main CPU 100' according to the second embodiment.

FIG. 8 is a flow chart which illustrates the routine for recording the manufacturer's serial number according to the second embodiment of the present invention.

Since the structure of the second embodiment is the same as that shown in FIG. 1, its description is omitted here. In a case where the structure is shown at the time of describing the operation, dash is added to the reference numeral shown in FIG. 1.

According to the first embodiment, in a case where a discrimination is, by the paper money detection portion 120', made that the image of paper money or the like is included in the image signal output from the CCD 26', the routine of recording the manufacturer's serial number is commenced and the flow of the operation performed by the main CPU 100' proceeds to S81 shown in FIG. 8.

In S81, waiting for predetermined time is performed in order to making the operations of the image processing portions 116' and 106' coincide with each other. Next in S82, a pair of manufacturer's serial number image signals are generated so as to be synthesized with the binary signal.

Next in S83, whether or not the image of paper money or the like has been detected is confirmed. If the same has been detected, the flow proceeds to S81. If the same has not been detected, the routine of recording the manufacturer's serial number is completed.

As described above, only in a case where the specific original document has been detected, the manufacturer's serial number can be added as the pattern.

<Third Embodiment>

The operation of the scanner portion of the digital color copying machine according to the present invention will now be described.

Since the overall structure of the copying machine is the same as that according to the first embodiment shown in FIGS. 1, 2 and 3, its description is omitted here. According to this embodiment, its scanner portion has characteristics and therefore the description will be mainly made about the scanner portion.

(Scanner Portion)

Figure 9:
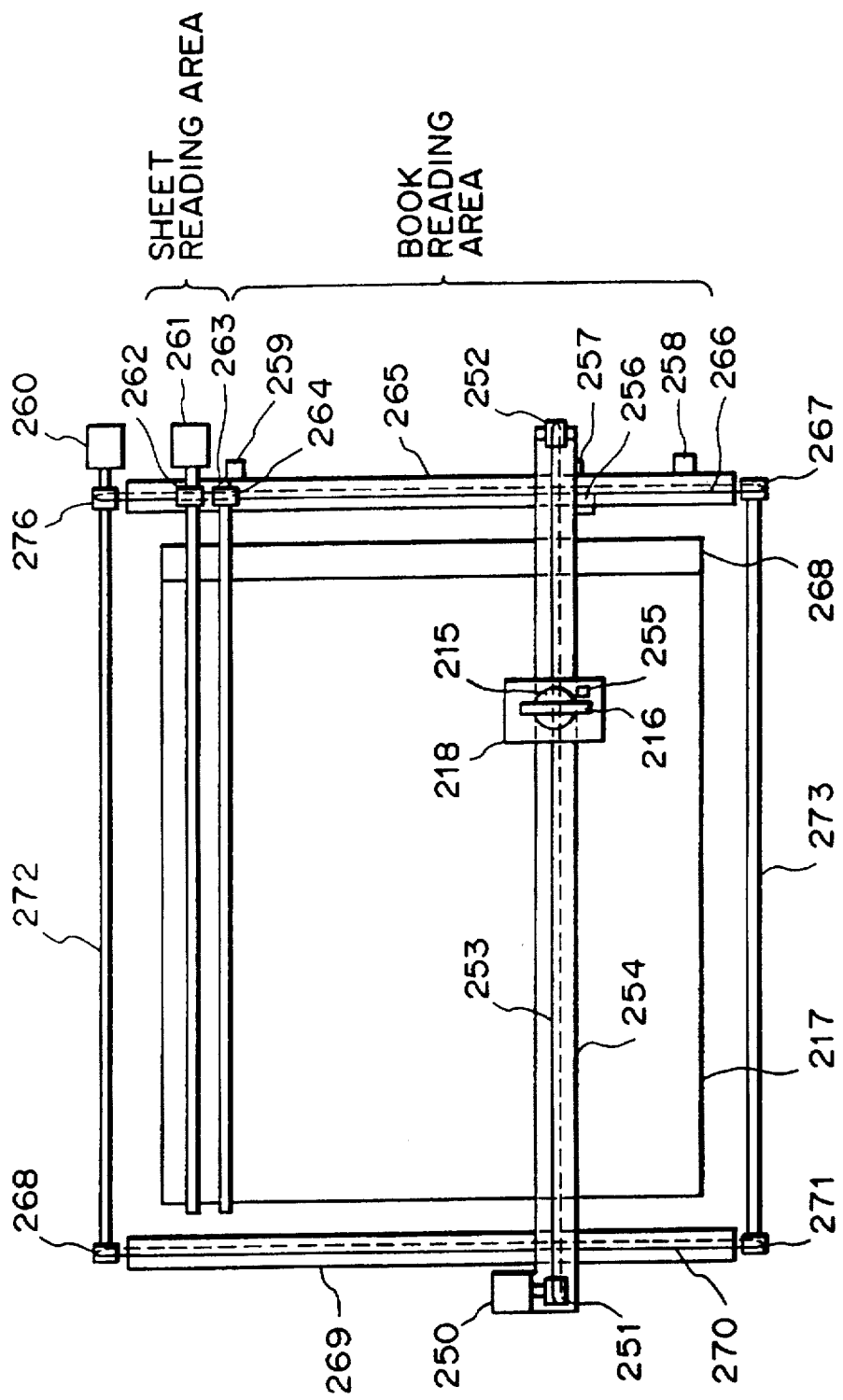
FIG. 9 is a top view which illustrates the internal structure of a scanner portion according to a third embodiment.

FIG. 9 is a top view which illustrates the internal structure of the scanner portion according to the third embodiment. Referring to FIG. 9, a CCD unit 218 is constituted by CCD 216 and a lens 215 and the like and is moved on a rail 254 by a main-scanning directional drive system composed of a main scanning motor 250 secured to the top surface of the rail 254, pulleys 251 and 252 and a wire 253, so that it reads the image on an original document retainer glass 217 in the main scanning direction. A light shielding plate 255 and a home position sensor 256 are used to control the position at the time of moving the CCD unit 218 to the main scanning home position in a correction area 268.

The rail 254 is placed on other rails 265 and 269 and is moved by a sub-scanning directional drive system composed of a sub-scanning motor 260, pulleys 267, 268, 271 and 276, shafts 272 and 273 and wires 266 and 270. A light shielding plate 257 and home position sensors 258 and 259 are used to control the position of the rail 254 when it is moved to the sub-scanning directional home position in a book mode in which an original document such as a book placed on the original document retainer glass 217 is read and a sheet mode in which a sheet original document is read.

A sheet feeding motor 261, sheet feeding rollers 274 and 275, pulleys 262 and 264 and a wire 263 form a mechanism for feeding the sheet original. The aforesaid mechanism is disposed on the original document retainer glass 217 to feed the sheet original document downwards placed on the glass by a predetermined quantity by the sheet feeding rollers 274 and 275.

Figure 10:
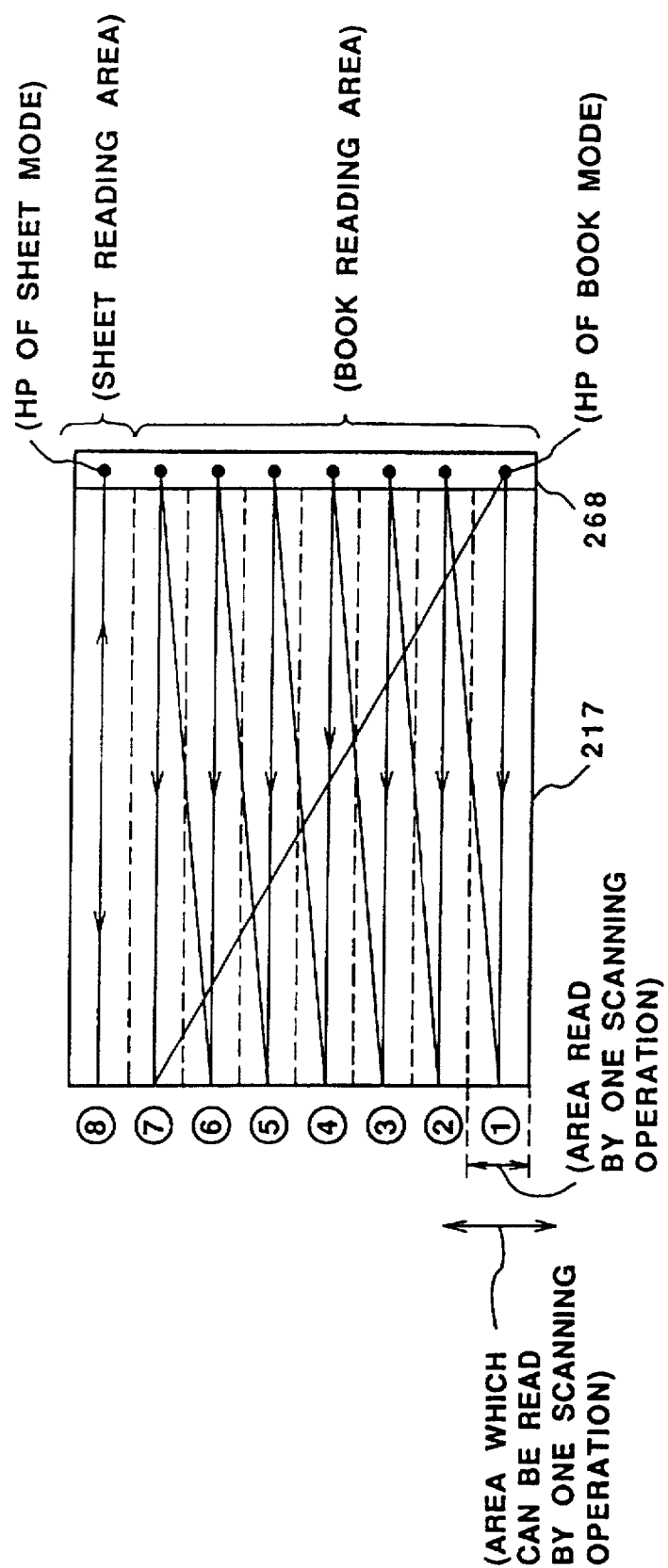
FIG. 10 is a view which illustrates a reading operation at the time of a book mode and a sheet mode according to the third embodiment.

FIG. 10 illustrates a reading operation performed in the book mode and the sheet mode according to the third embodiment.

In the book mode, the CCD unit 218 is moved to a book mode home position (book mode HP) positioned in a correction area 68 shown in FIG. 10, and an operation of reading the entire surface of the original document placed on the original document retainer glass 17 is commenced. Prior to performing the operation of scanning the original document, parameters required to perform a shading correction operation, a black level correction operation and a color correction operation and the like are set in the correction area 268. Then, a main scanning directional operation is commenced by the main scanning motor 250 in a direction designated by arrow shown in FIG. 10.

When an operation of reading area (1) shown in FIG. 10 has been completed, the rotation of the main scanning motor 250 is reversed and the sub-scanning motor 260 is rotated to move the sub-scanning direction to the correction area in area (2). Then, similarly to the main scanning of the area (1), the shading correction operation, the black level correction operation and the color correction operation and the like are performed if necessary and an operation of reading the area (2) is performed.

By repeating the aforesaid scanning operations, the entire surface of areas (1) to (7) is read. When the area 7 has been read, the CCD unit 218 is again returned to the book mode home position.

Since the original document retaining glass 17 according to this embodiment is able to read an original document the size of which is A2 or smaller, the aforesaid scanning operations must be performed more frequently. However, it is described simply in order to make the operation understood easily.

In the sheet mode, the CCD unit 218 is move to a sheet mode home position (sheet mode HP) to repeatedly read area (8) of the sheet original document by intermittently rotating the sheet feeding motor 261, so that the entire surface of the sheet original document is read.

Prior to scanning the original document, the shading correction, the black level correction and the color correction and the like are performed by the correction area 268. Then, the main scanning motor 250 commences the main scanning directional scanning in a direction designated by an arrow shown in FIG. 10. When the area (8) has been read by the forward scanning operation, the rotation of the main scanning motor 250 is reversed and the returning directional scanning is commenced. During the aforesaid returning directional scanning, the sheet feeding motor 261 is rotated to move the sheet original document in the sub-scanning direction. The aforesaid operations are repeated, so that the entire surface of the sheet original document is read.

Assuming that the aforesaid reading operation is a equal magnification reading operation in a copying process, the area which can be read by the CCD unit 218 is a wide area shown in FIG. 10. The reason for is that the digital color copying machine according to this embodiment includes the variable magnification function such as enlarging and reducing the magnification. Since a region which can be recorded by the recording heads (M, C, Y and BK) is fixed to 256 bits for one time, image information of a region of 512 bits (lines) which is twice the aforesaid number of bits must be used if a 50%-reduction operation is performed. Therefore, the scanner portion has a function capable of reading image information about an arbitrary image region by one main scanning reading operation to output it.

<Overall Functional Block>

The functional block of the digital color copying machine according to this embodiment will now be described.

Figure 11:
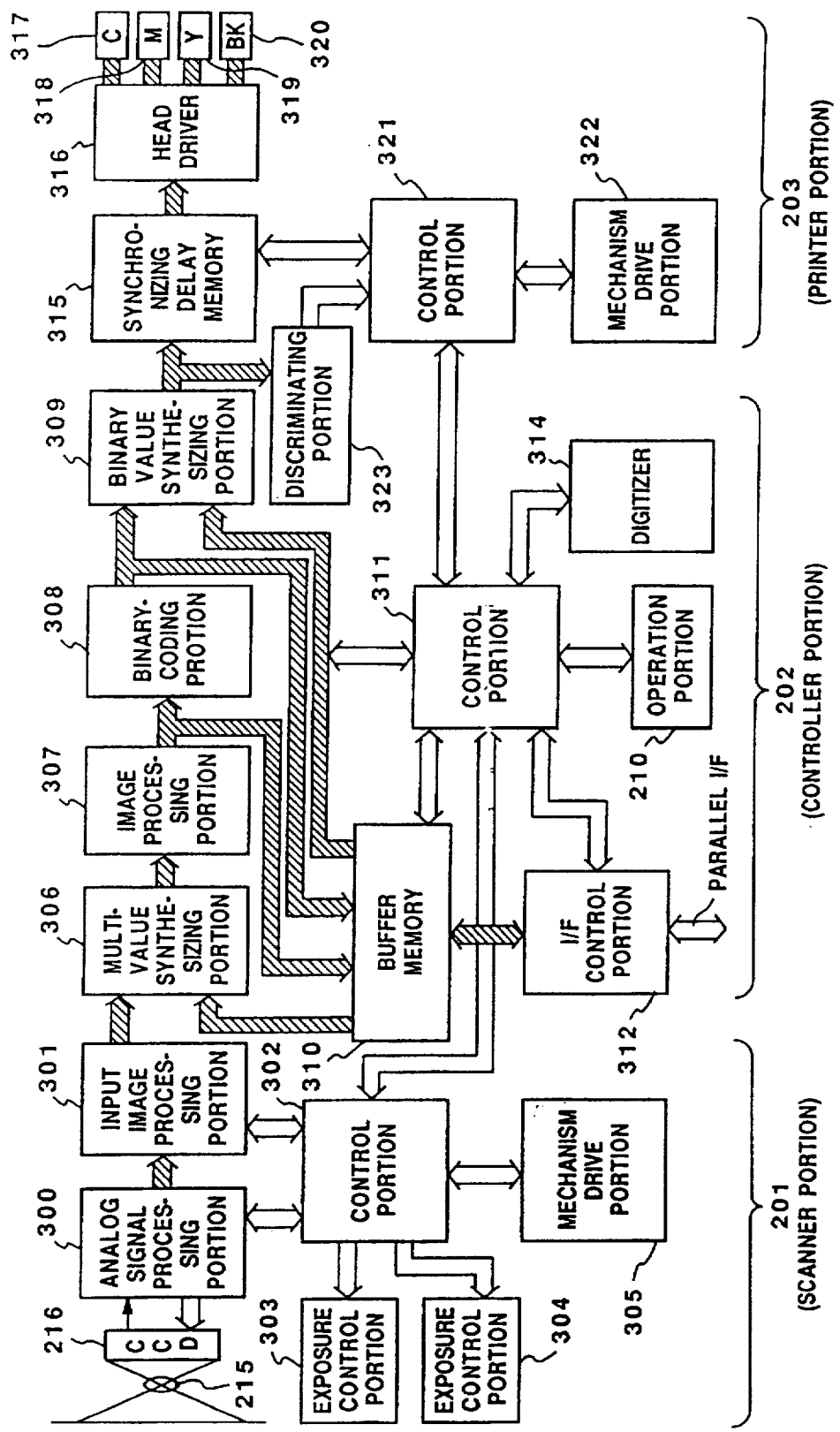
FIG. 11 is a block diagram which illustrates the structure of a digital color copying machine according to the third embodiment.

FIG. 11 is a block diagram which illustrates the structure of the digital color copying machine according to the third embodiment of the present invention. Referring to FIG. 11, control portions 302, 311 and 321 are control circuits for respectively controlling a scanner portion 201, a controller portion 202 and a printer portion 203. The control portions 302, 311 and 321 are formed by a microcomputer, a program ROM, a data memory and a communication circuit and the like (omitted from illustration). The portion between the control portion 302 and the control portion 311 and that between the control portion 111 and the control portion 321 are respectively connected to each other by communication lines and the control portions 302 and 321 are operated in response to commands issued from the control portion 311. Thus, a so-called master-slave control system is employed.

The control portion 311 is operated according to an input command supplied from an operation portion 210 and a digitizer 314 in a case where the subject apparatus is operated as a color copying machine. The operation portion 210 has a display portion formed by a liquid crystal display and a touch panel made of a transparent electrode located on the surface of the display portion, so that a selective instruction such as an instruction of color of color-conversion and an instruction of an editorial operation can be made. As key switches relating to the operations, the following keys which are used frequently are individually disposed: a start key for instructing to start the copying operation, a stop key for instructing to stop the copying operation, a reset key for returning the operation mode to a normal state and a projector key for selecting a projector and the like.

The digitizer 314 is used to input positional information about a region to be subjected to the trimming process, the masking process and the color conversion process. If a complicated editorial process is required, the digitizer 314 is connected as an option. The control portion 311 also controls an I/F control portion 312 which is a control circuit for IEEE-488, that is a general-purpose parallel interface such as a GP-IB interface. The aforesaid interface is used to input/output image data to and from external equipment, for example host computer, and to remote-control the apparatus by an external device. The control portion 311 controls a multivalue synthesizing portion 306 for performing a various image processing operations, an image processing portion 307, a binarycoding portion 308, a binary value synthesizing portion 309 and a buffer memory 310.

The control portion 302 controls a mechanism drive portion 305 for controlling the mechanism of the scanner portion 201, an exposure control portion 303 for controlling an exposure lamp for use to read a reflected original document and an exposure control portion 304 for controlling an exposure halogen lamp (omitted from illustration) for use when a projector (omitted from illustration) is used. The control portion 302 also controls an analog signal processing portion 300 and an input image processing portion 301 for processing the image.

The control portion 321 controls a synchronizing delay memory 315 for absorbing the time scattering taken place between the operation of the mechanism drive portion 305 for controlling the printer portion 203 and that of the printer portion 203 and correcting a delay taken place due to the mechanical configuration of recording heads 317 to 320.

Then, the image processing block of the digital color copying machine according to this embodiment will now be described with reference to a flow of the image signal.

An image formed on the CCD 216 is converted into an analog electric signal by the CCD 216. The image information thus converted is subjected to a serial process in the order of for example, red, green and blue and is supplied to the analog signal processing portion 300. In the analog signal processing portion 300, the image information is subjected to the sample & hold process, the dark level correction and the dynamic range control for each color of red, green and blue and is analog-to-digital converted (A/D converted), so that it is converted into a serial multivalue digital image signal (the length for each color is 8 bits according to this embodiment) which is then outputted to the input image processing portion 301. The input image processing portion 301 directly subject the serial multivalue digital image signal to the correction processes required for the reading system such as the shading correction, the color correction, the γ-correction operations.

The multivalue synthesizing portion 306 of the controller portion 202 is a circuit block for selecting and synthesizing the serial multivalue digital image signal supplied from the scanner portion 201 and the serial multivalue digital image signal supplied via the parallel I/F. The selected and synthesized image data is supplied to the image processing portion 307 while being formed into the serial multivalue digital image signal as it is. The image processing portion 307 subjects image data to the smoothing process, the edge highlighting process, the black extraction process and a masking process for correcting the color of recording ink for use in the recording heads 317 to 320. The serial multivalue digital image signal outputted from the image processing portion 307 is supplied to the binary-coding portion 308 and the buffer memory 310.

The binary-coding portion 308 is a circuit for binarycoding the serial multivalue digital image signal and may be operated according to a simple binarization by means of a fixed slice level, a pseudo-half tone process by the dither method selected. In the binary-coding portion 308, the serial multivalue digital image signal is converted into a binary parallel image signal for four colors. Image data for four colors is supplied to the binary value synthesizing portion 309 and that for three colors is supplied to the buffer memory 310.

The binary value synthesizing portion 309 is a circuit for selecting and synthesizing the binary parallel image signal for the three colors supplied from the buffer memory 310 and the binary parallel image signal for the four colors supplied from the binary-coding portion 208 to form a binary parallel image signal for four colors. The buffer memory 210 is a buffer memory for inputting/outputting a multivalue image and a binary image via the parallel I/F and has a memory for three colors.

Multivalue image data from I/F control portion 312 is sent to multivalue synthesizing portion 306 and binary image data is sent to binary value synthesizing portion 309.

The synchronizing delay memory 315 of the printer portion 203 has a capacity of 2 megabyte (hereinafter called "MB" for a color and therefore the short side of a copying paper, the size of which is A1 or smaller, corresponds to one main scanning operational length according to this embodiment. Since the memory of 2 MB for a color is possessed, a delay of about 7 main scanning operations can be obtained from equation: 16777216/{594×256×(400/25.4)}.

An image discriminating portion 323 to be described later is disposed just before the synchronizing delay memory 315, so that an image which is discriminated by the image discriminating portion 323 is printed while being delayed by about 7 main scanning operations. The delay memory 315 has a function of absorbing the time scattering taken place in the mechanical operation of the printer portion 203 and a function of correcting the delay generated due to the mechanical configuration of the recording heads 317 to 320. The delay memory 315 generates timing required to drive the recording heads 317 to 320.

A head driver 316 is an analog drive circuit for driving the recording heads 317 to 320 by generating signals which are capable of directly driving the recording heads 317 to 320. The recording heads 317 to 320 respectively discharge cyan (C) ink, magenta (M) ink, yellow (Y) ink and black (BK) ink to record an image on the recording paper.

Figure 12:
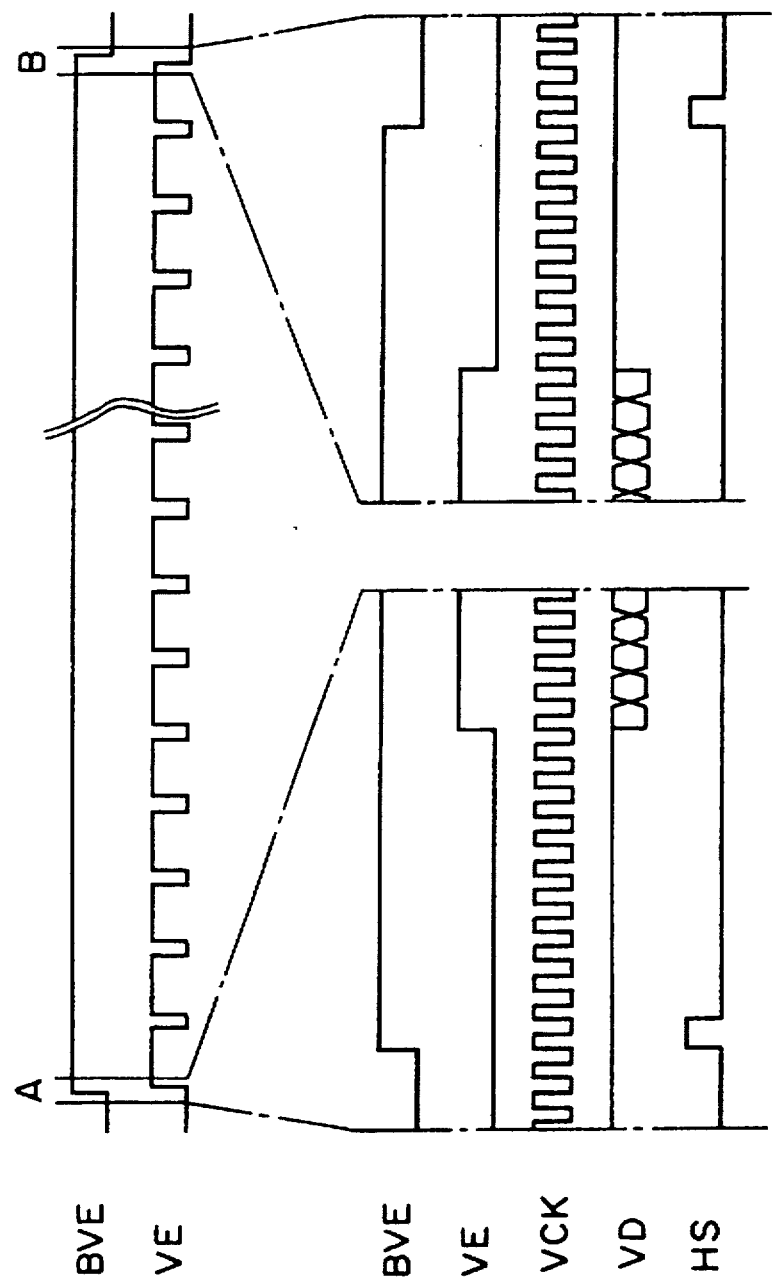
FIG. 12 is an image timing chart for the functional blocks of the digital color copying machine shown in FIG. 11.

FIG. 12 is an image timing chart for use in the functional block of the digital color copying machine shown in FIG. 11. Referring to FIG. 12, signal BVE denotes an image effective region for each scanning operation in the main scanning reading operation shown in FIG. 10. By outputting the signal BVE plural times, the image of the overall original document is outputted. Signal VE is a signal denoting the effective region for an image for each line read by the CCD 216. When the signal BVE is effective, the signal VE becomes effective.

Referring to FIG. 12, signal VCK for portions of the signals BVE and VE which are obtained by enlarging portions A and B is a clock signal for transmitting image data VD. The signals BVE and VE are changed in synchronization with the signal VCK.

Signal HS is a signal for use in a case where the signal VE discontinuously repeats the effective region and an ineffective region during an output for one line, the signal HS denoting the commencement of the one-line image output. The signal HS is not required in a case where the signal VE is continuously effective during an output for line.

Binary image data for C, M, Y and Bk supplied from the binary value synthesizing portion 309 is delayed by the synchronizing delay memory 315 by about 7 main scanning operation. Then, the binary image data is printed and recorded by the recording heads 317 to 320 and is as well as supplied to the image discriminating portion 323. The image discriminating portion 323, in a real time manner, compares the supplied binary image data and specific image data, which has been previously registered. If the supplied binary image data shows significant similarity with the specific image data, the image discriminating portion 323 supplies a discriminating signal to the control portion 321 to stop the printing operation. At this time, the control portion 321 informs the control portions 302 and 311 that the aforesaid fact has been caused.

Since a portion of the specific image data has passed the image discriminating portion 323 when the image discriminating portion 323 detects the specific image data, the specific image data is not printed out if all of the specific image data is left in the synchronizing delay memory 315.

The image discriminating portion 323 is able to binary image data which corresponds to the specific image data if it is 400 dpi and covers substantially 88 mm square.

Since the quantity of delay of the image data corresponds to about 7 main scanning operation and therefore an image can be stored by a length of 110 mm (15.7 mm×7 since printing by 256 nozzles in the sub-scanning direction is performed in one main scanning operation) in the sub-scanning direction, the specific image data is detected before it is printed. At this time, printing is stopped and thereby printing of the specific image data is inhibited.

That is, since a digital color copying machine of the type according to this embodiment is capable of directly printing binary image data via the I/F control portion 312 and the buffer memory 310 if a host computer or the like is used, its image discriminating portion 323 must be arranged to discriminate whether or not printing is performed according to a binary image data just before printing in order to inhibit printing of the specific image data through the aforesaid route.

(Image Discriminating Portion)

Figure 13:
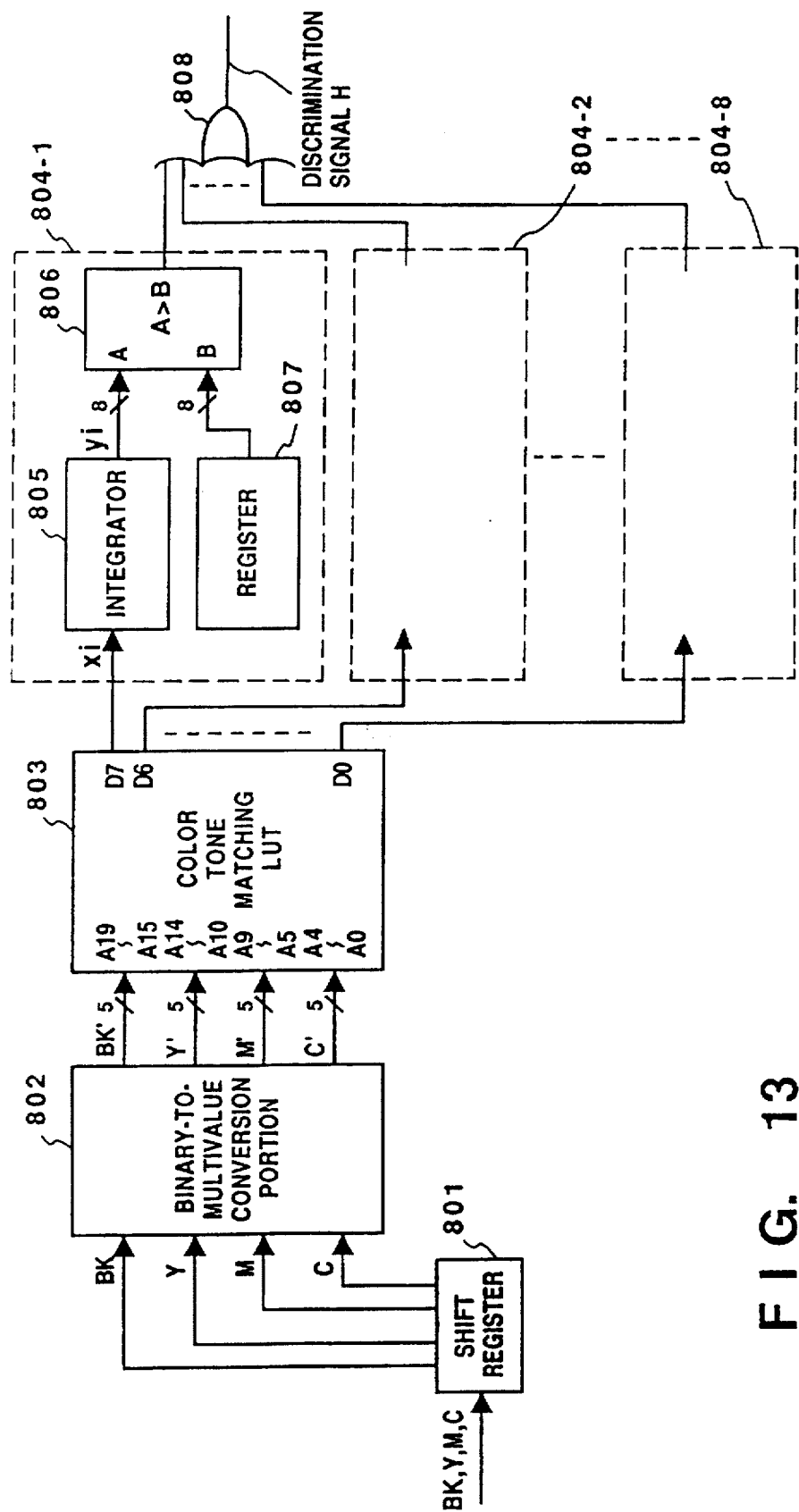
FIG. 13 is a block diagram which illustrates the structure of an image discriminating portion 323 shown in FIG. 11.

FIG. 13 is a block diagram which illustrates the structure of the image discriminating portion 323 shown in FIG. 11.

First, the binary-to-multivalue conversion to be performed in the image discriminating portion 323 will now be described with reference to FIG. 13. Referring to FIG. 13, reference numeral 810 represents a shift register for converting image signals for C, M, Y and BK supplied in the form of a serial signal into parallel signals and in this way and that a timing control portion (omitted from illustration) converts the serial binary image data for C, M, Y and BK into the parallel signals. Reference numeral 802 represents a binary-to-multivalue conversion portion for converting the binary image data, which has been converted into the parallel signal by the shift register 801, into multivalue image data of 5 bits for each color. The reason why the width of the bit is determined to be 5 bits lies in that the load acting on the ensuing process in the circuit must be reduced and the specific original document must be detected reliably. Furthermore, the image data to be converted from the binary data into the multivalue data is selectively converted into the multivalue data in such a manner that one pixel for each four pixels is converted into the multivalue data. The reason for this also lies in the aforesaid requirements.

Reference numeral 803 represents a matching lookup table (hereinafter called a "color tone matching LUT" hereinafter) which is a ROM for matching the color tones which are the characteristics of plural kinds of specific original documents. Reference numerals 804-1, 804-2, . . . , 804-8 represent color tone discriminating circuits respectively formed by similar hardware. As typically shown by the color tone discriminating circuit 804-1, each of the color tone discriminating circuit is formed by an integrator 805, a register 807 and a comparator 806 and is capable of discriminating whether or not the specific original document is present in the image data. Reference numeral 808 represents an OR circuit for outputting "1" as a result of a discrimination in a case where one or more outputs from the color tone discriminating circuits 804-1 to 804-8 denote a fact that the specific original document is present. Since the contents of the register 807 are different for each discriminating circuit, comparisons with 8 types of the specific original documents can be performed simultaneously.

(Binary-to-Multivalue Conversion Circuit)

FIGS. 14, 15 and 16 illustrate the binary-to-multivalue conversion method according to the third embodiment of the present invention.

According to this embodiment, the supplied binary image data is subjected to the area process as shown in FIG. 14. That is, as shown in FIG. 14, a matrix of 5 pixels×5 pixels is used to obtain the sum of the cells in which image data is present for the purpose of obtaining the density level of a subject pixel 901. Each cell has a weight coefficient at this time and therefore a value multiplied by the weight coefficient becomes data about each cell.

Assuming that the weight coefficient of each cell of the matrix is xi, yi (i, j=1 to 5), density level e of the subject pixel can be obtained by the following Equation (1):

$$\sum_{i=1}^{5}\sum_{j=1}^{5}(x_i \cdot y_j \cdot a) \quad (1)$$

where a is image data and is 1 or 0 because it is a binary image here.

FIG. 16 illustrates an example of the weight coefficient, wherein the highest density level is "61" in the decimal format and therefore all of the density levels can be expressed with the data width of 5 bits in the binary format.

Figure 17:
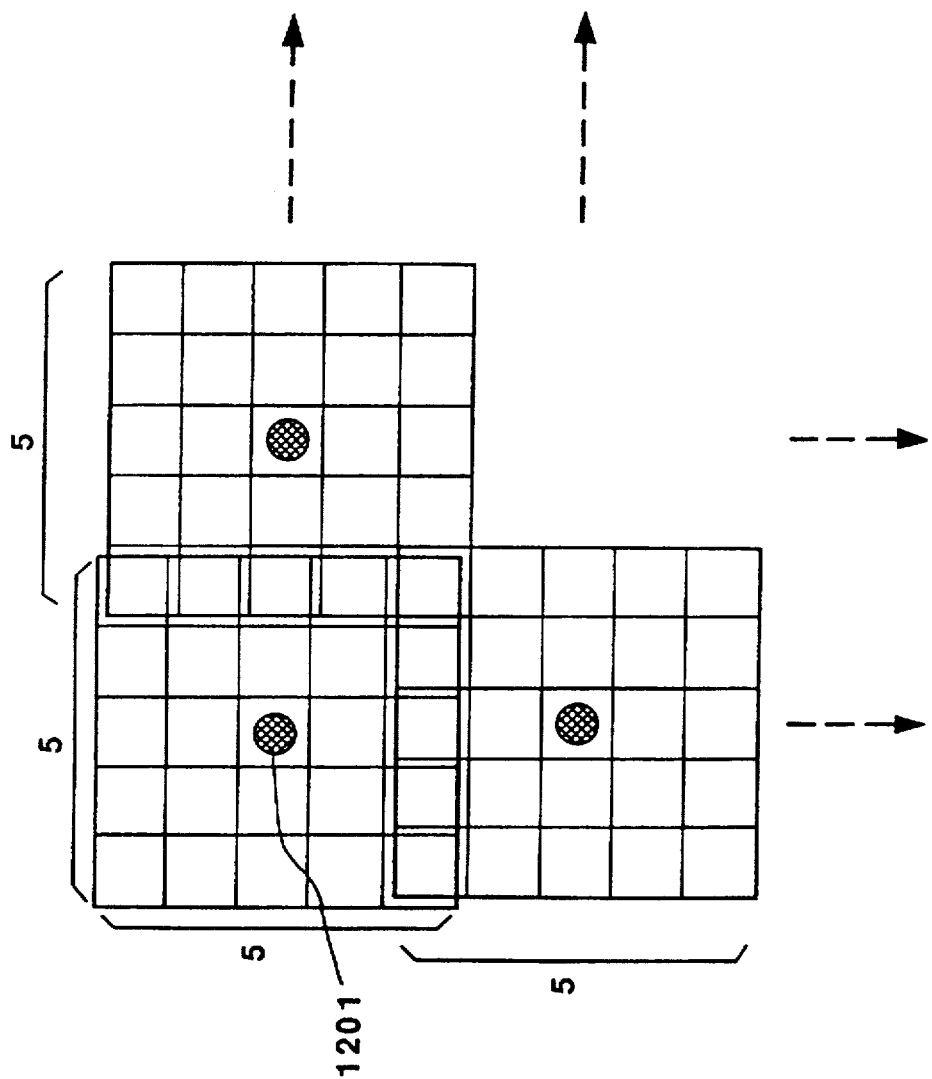
FIG. 17 is a view which illustrates a multivalue conversion method according to the third embodiment in which image data is thinned.

Then, a method of performing the multivalue-conversion while thinning the image data will now be described with reference to FIG. 17.

When the image data is thinned before the multivalue conversion is performed, the subject pixel 1201 is converted into multivalue data, and the fifth image data is made to be the subject pixel which is converted into the multivalue data.

The binary-to-multivalue conversion portion 802 has individual circuits for each color code C, M, Y and BK. The image data for C, M, Y and BK, which have been binary-to-multivalue converted by the aforesaid method are supplied to the color tone matching LUT 803 shown in FIG. 13.

(Discriminating Circuit)

The color tone matching LUT 802 shown in FIG. 13 is formed by a ROM and performs the matching the color tone of the supplied image data and those of plural kinds of specific original documents (for example, paper money or securities which are the subject of the prevention of forgery), the color tone being the characteristics of an image. That is, the color tone matching LUT 803 stores color tone distribution previously examined about the 8 types of specific original documents and results of discriminations made whether or not the color tones of supplied image data coincide with the color tones of the aforesaid specific original document.

As described above, the color tone matching LUT 803 has 20-bit address lines of A0 to A19 and, in units of 5 bits, receives image data for each C, M, Y and BK converted into the multivalue data by the binary-to-multivalue conversion portion 802. The color tone matching LUT 803 has 8-bit (D0 to D7) data output lines to discriminate 8 types of original documents since each bit corresponds to one type of the specific original document.

(Integrator)

Figure 18:
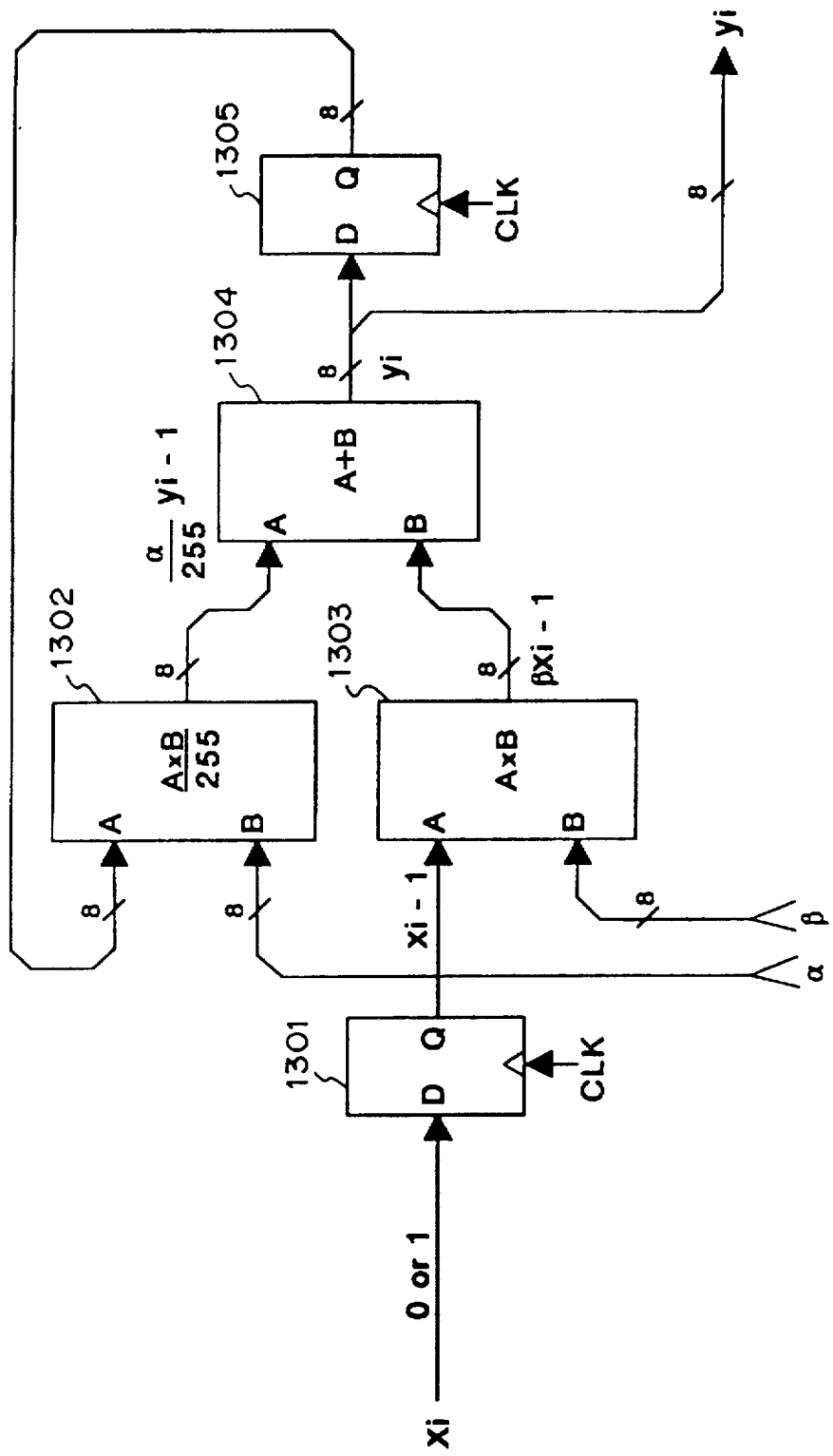
FIG. 18 is a block diagram which illustrates the structure of an integrator according to the third embodiment.

FIG. 18 is a block diagram which illustrates the structure of the integrator according to the third embodiment. Referring to FIG. 13, reference numerals 1301 and 1305 represent flip-flops for holding data at the timing of the first transition of a CLK signal. Reference numeral 1302 represents a multiplier which receives two input signals (A and B) of 8 bits and outputs an 8-bit signal (A×B/255) denoting the result of the multiplication. Reference numeral 1303 represents a multiplier which receives a 1-bit input signal (A) and an 8-bit input signal (B) and which outputs an 8-bit output signal (A×B) denoting the result. Reference numeral 1304 represents an adder which receives an 8-bit input signals (A and B) and which outputs an 8-bit signal (A+B).

As a result of the aforesaid calculations, the integrator 805 receives a binary input signal xi and outputs an 8-bit output signal yi expressed by the following Equation (2):

$$yi=(\alpha/255)yi-1+\beta \cdot xi-1 \quad (2)$$

where $\alpha$ and $\beta$ are predetermined constants which determined various characteristics of the integrator 805.

Figure 19:
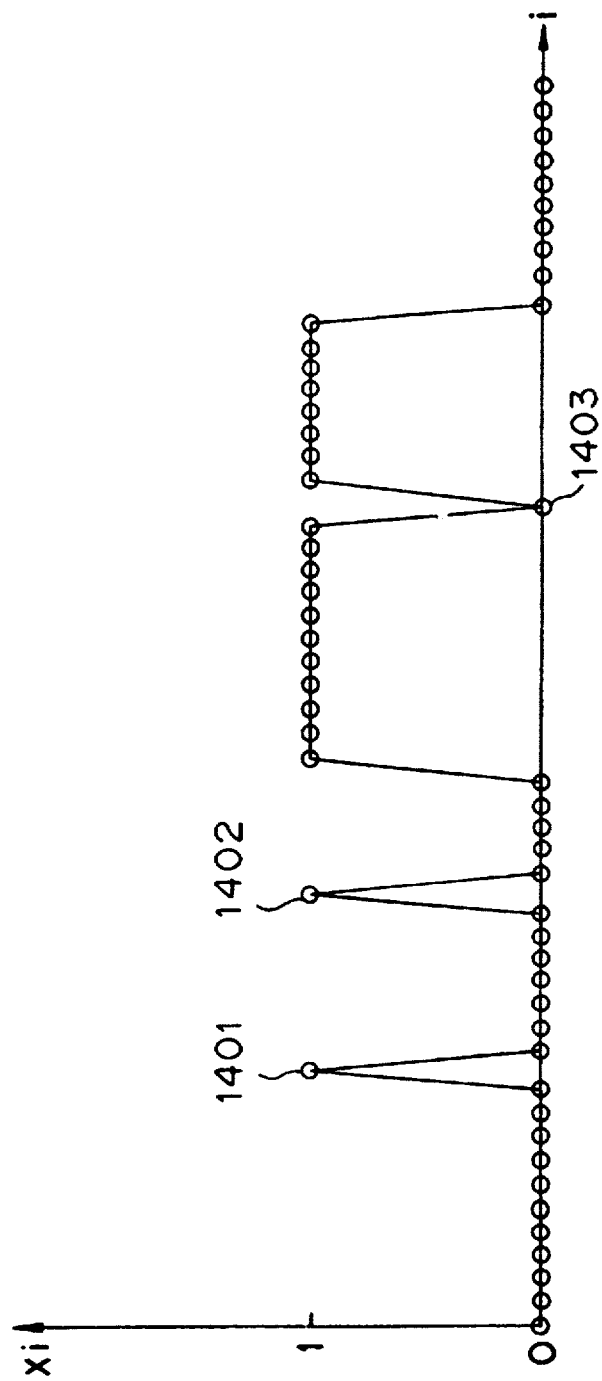
FIGS. 19 and 20 are views which illustrate an example of input/output of the integrator according to the third embodiment.
Figure 20:
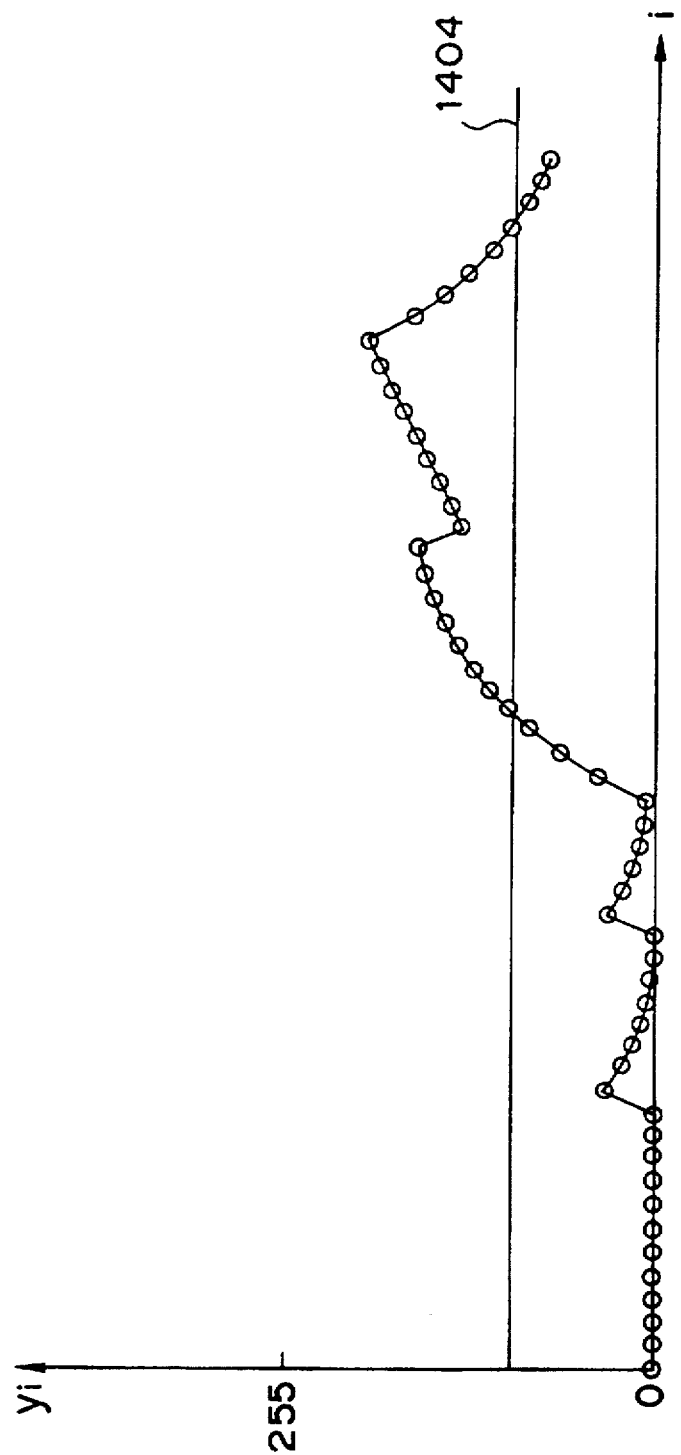

FIGS. 19 and 20 illustrate an example of input and output from the integrator according to the third embodiment.

The integrator 805 receives xi as shown in FIG. 19 and outputs yi as shown in FIG. 20. That is, an input such as dots 1401 and 1402, having a level of substantially "0" in its surrounding portion and itself having level of "1", or an input such as a dot 1403, the level of which is substantially "1" and the level of which is "0", are considered to be noise. When the aforesaid inputs are processed by the integrator 805, its output becomes as shown in FIG. 20. Accordingly, a threshold such as a level 1404 shown in FIG. 20 is provided for the register 807 shown in FIG. 20 so as to be used to binary-code the output yi from the integrator. As a result, the aforesaid noise can be eliminated.

(Result of the Process)

Figure 21:
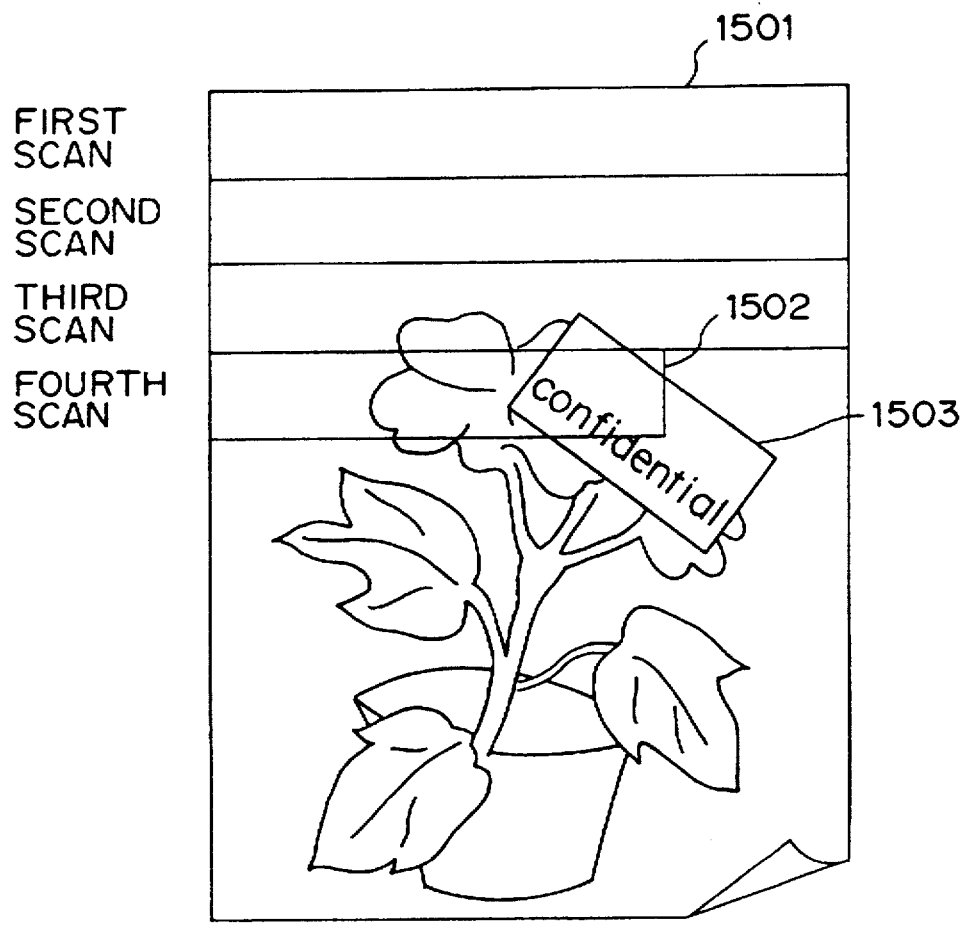
FIG. 21 illustrates an example of the result of a process according to the third embodiment.

FIG. 21 illustrates an example of the result of the processing performed according to the third embodiment. Referring to FIG. 21, an original document 1501 has, in a portion of the image thereof, an image 1503 of the specific original document which must be discriminated by the digital color copying machine according to this embodiment. FIG. 21 illustrates a case in which a portion of the image 1503 of the specific original document is detected at the fourth scanning point 1502. When the digital color copying machine detects the specific original document, it immediately stops scanning of the original document and stops printing. As described above, since the digital color copying machine according to this embodiment has a delay memory of 7 scans and the fact that the subject original document is the specific original document was detected at the fourth scan, printing has not been started and printing is not performed in this case.

As described above, printing of an image obtained by copying the original document and that of image data corresponding to the specific original document supplied from host equipment such as a computer are inhibited.

As described above, according to this embodiment, image data in a dot-sequential type image forming apparatus is, at the time of forming an image, delayed sufficiently to detect that the read original document is the specific original document, and whether or not delayed image data is printed is determined according to the result of a comparison made between pre-delayed image data and a predetermined image. Therefore, even if a portion of an image of the specific original document is present, it is not printed. Therefore, forgery of the specific original document can be perfectly inhibited.

The present invention may be modified variously within the spirit thereof.

For example, the aforesaid embodiment is described about the digital color copying machine arranged to detect the specific original document from binary image data, the present invention is not limited to the aforesaid data to be processed. For example, the present invention may be embodied in an image forming apparatus of dot sequential type which is capable of printing multivalue data.

<Fourth Embodiment>

Figure 22:
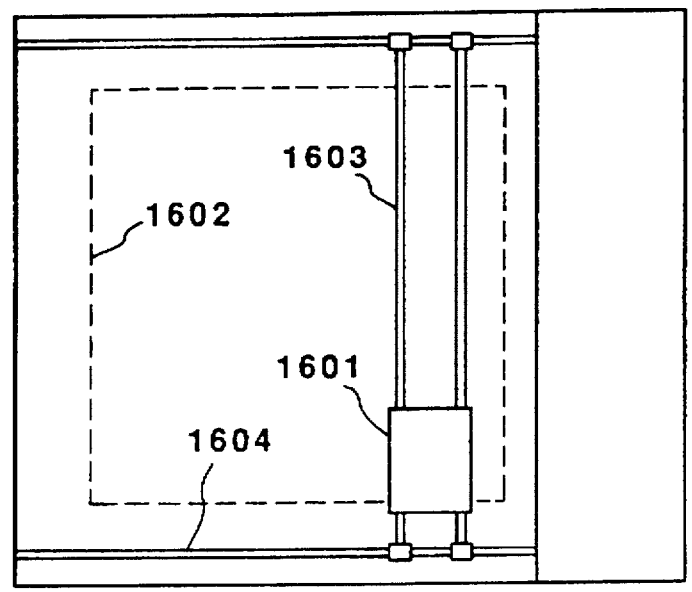
FIG. 22 is a top view which illustrates the structure around a scanning carriage according to a fourth embodiment of the present invention.

FIG. 22 is a top view which illustrates the structure around the scanning carriage according to a fourth embodiment of the present invention. The present invention may be embodied in a printer apparatus according to the fourth embodiment which prints data in such a manner that the recording paper is fixed and printing is performed by the scanning carriage moving in both main scanning direction and sub-scanning direction.

Referring to FIG. 22, reference numeral 1601 represents a scanning carriage for use to print data while being placed on a main scanning rail 1603 so as to be moved in the main scanning direction, the main scanning rail 1603 being placed on a sub-scanning rail 1604 so as to be moved in the sub-scanning direction.

The printer apparatus thus-structured may be arranged to perform the operation of preventing forgery of the specific original document during a process of forming a full color image on the recording paper 1602. Thus, the forgery can be effectively prevented.

<Fifth Embodiment>

The present invention may be embodied in an image forming apparatus according to a fifth embodiment arranged in such a manner that printing nozzles are disposed in the main scanning direction in a number which is sufficient to cover the width of the recording paper.

Figure 23:
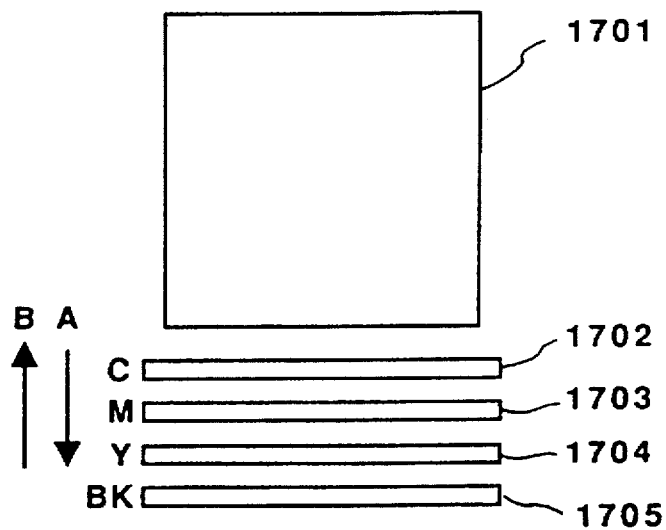
FIG. 23 is a view which illustrates a scanning method according to a fifth embodiment of the present invention.

FIG. 23 illustrates a scanning method according to a fifth embodiment of the present invention. Referring to FIG. 23, reference numeral 1701 represents recording paper which has no data recorded thereon and which is, at the time of recording, scanned in a direction designated by arrows A, so that data is recorded in cyan (C), magenta (M), yellow (Y) and black (BK) by four recording heads 1702 to 1704. The recording heads 1702 to 1704 each have nozzles in a number sufficiently large to record one side of the recording paper 1701 in order to record data at high speed.

Also in the image forming apparatus thus constituted, if the specific original document is detected, a stitch pattern is printed on the formed image portion while returning the scanning direction in a direction designated by arrows B. As a result, forgery can be prevented.

<Sixth Embodiment>

A sixth embodiment will now be described.

A copying machine according to the sixth embodiment is constituted in such a manner that the scanner portion according to the third embodiment further comprises a pattern memory which stores a stitch pattern.

(Scanner Portion)

Figure 24:
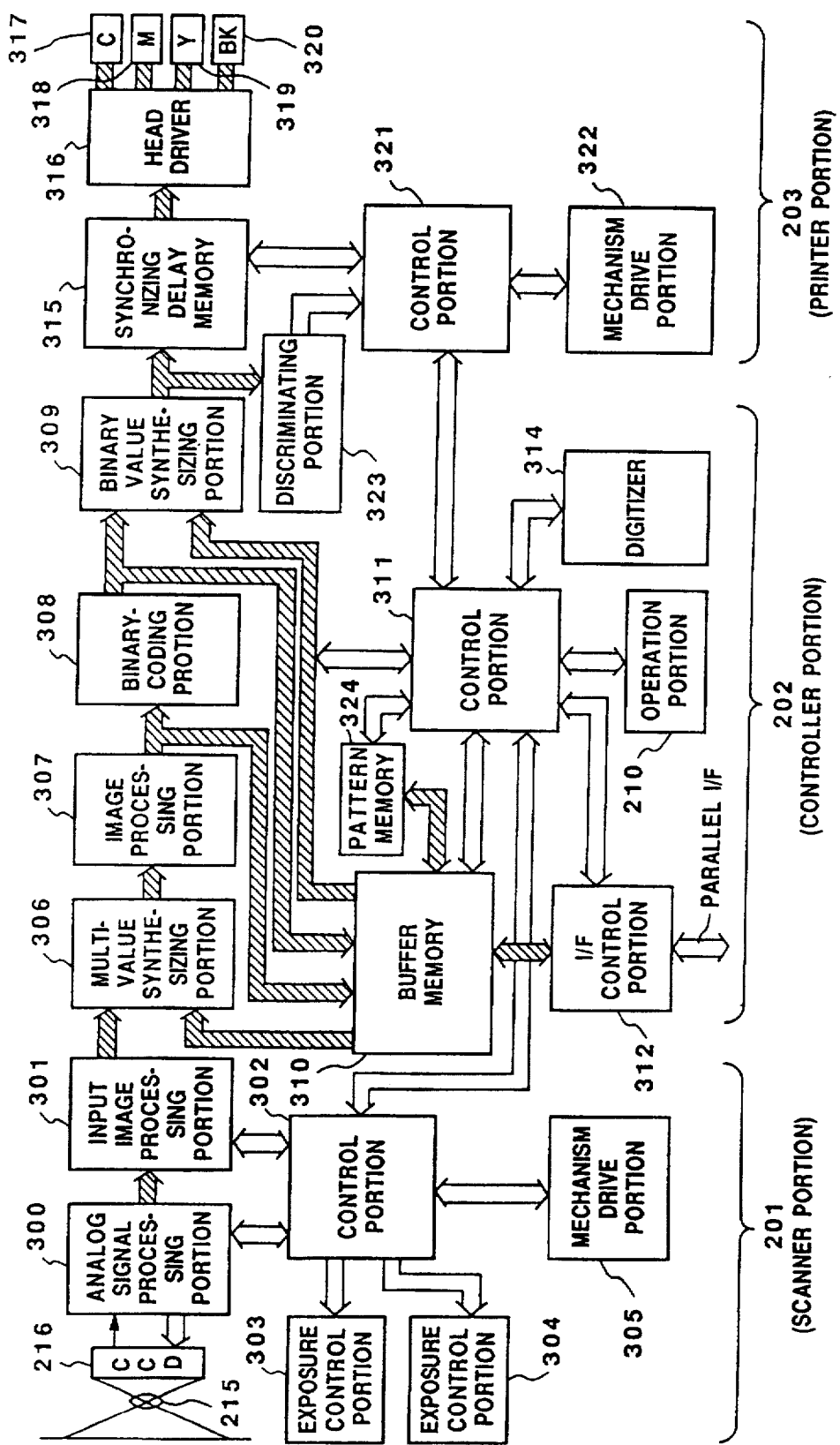
FIG. 24 is a block diagram which illustrates the structure of a digital color copying machine according to a sixth embodiment.

FIG. 24 is a block diagram which illustrates the structure of a digital color copying machining according to a sixth embodiment of the present invention. Referring to FIG. 24, the same circuits as those shown in FIG. 6 are given the same reference numerals and their descriptions are omitted here. Reference numeral 324 represents a pattern memory which stores a stitch pattern.

A buffer memory 310 receives a stitch pattern signal transmitted from the pattern memory 324 in response to an instruction issued from the control portion 311. The stitch pattern signal is an add-on signal to be added to image data of the specific original document and is composed of a binary black signal. The stitch pattern signal stored in the buffer memory 310 is supplied to the binary value synthesizing portion 309.

Since the operation of this embodiment is performed similarly to the operation of the aforesaid third embodiment, its description is omitted here.

Then, the result of the process will now be described.

Figure 25:
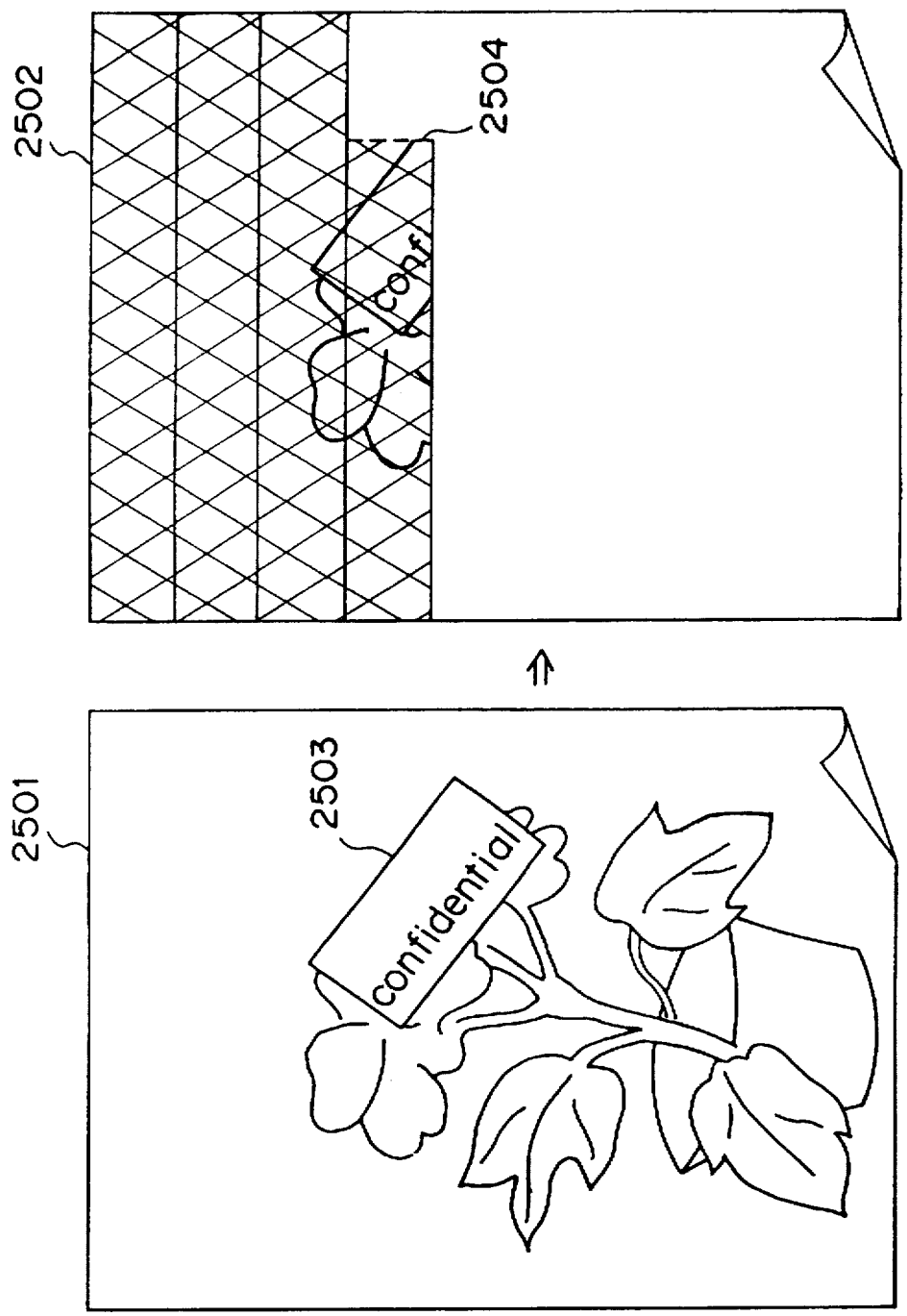
FIG. 25 is a view which illustrates the result of a processing according to the sixth embodiment.

FIG. 25 illustrates an example of the result of the processing performed according to the sixth embodiment. Referring to FIG. 25, reference numeral 2501 represents an original document having, in a portion of the image thereof, a specific original document 2503 which must be discriminated in this apparatus. The result of an output obtained in a case where it is copied by the apparatus according to this embodiment is represented by 2502. FIG. 25 illustrates a case in which a fact, that the subject original document is the specific original document was detected at a portion which corresponds to the specific original document 2503 at a point 2504 which is the fourth scan point. When the specific original document is detected, scanning of the original document and the printing operation are interrupted and the stitch pattern is printed in a black component by a pattern generator portion (the pattern memory 324)(omitted from illustration). Referring to FIG. 3 which illustrates the first embodiment, the scanning carriage (corresponding to the scanning carriage 34) is scanned in the direction B at this time. When the scanning carriage is returned to a home position sensor (corresponding to the home position sensor 41), a paper feeding roller (corresponding to the roller 28) is rotated reversely so as to return the copying paper 2502 to the third scan position. Then, the switch pattern is printed on the line at the third scan position. The aforesaid operation is repeated until reaching the first scan position, so that the stitch pattern is printed all of the formed image. During the aforesaid operation, all of the key manipulating operations and commands supplied from host equipment such as a computer must, of course, be disregarded. As described above, a copy of the original document and image data corresponding to the specific original document and supplied from host equipment such as a computer are not printed normally.

As described above, according to the sixth embodiment, a so-called dot sequential type image forming apparatus is enabled to have a countermeasure taken against the forgery of an image formed prior to the detection of a fact that the subject original document is the specific original document. Therefore, a perfect countermeasure against forgery can be provided.

The forgery preventing pattern according to this embodiment is not, of course, limited to the stitch pattern.

Although each of the aforesaid embodiments is described with references to application to the ink-jet copying machine, the present invention is not limited to this and is therefore embodied in an electrophotographic system, a thermosensitive system and a photographic system. In particular, it may be applied to a so-called bubble jet type printer having a head of a type for discharging a liquid droplet by utilizing film boiling taken place by heat energy.

Also the present invention is not limited to the color copying machine and it may be utilized in a monochrome digital copying machine for converting an image signal into a binary signal.

Furthermore, the input is not limited to that made from the scanner as is done in the aforesaid copying machine. The present invention can be applied to a system for printing by processing an image supplied from external equipment via an I/F or a system in which an image supplied from a communication apparatus is processed so as to be printed.

In addition, data to be generated by the pattern generator is not limited to the manufacturer's serial number, and any code such as the bar code may therefore by utilized if the apparatus can be specified according to the copied paper money. The data is not also limited to the code for identifying the apparatus, and therefore any code denoting the location of the apparatus, date, the name of an owner or user may be used.

The color for use to record the identification code such as the manufacturer's serial number. Any color can be employed to record it.

Furthermore, the present invention is not limited to the paper money as the specific original document. It can therefore be applied to any document such as securities and variable document, the copy of which must be inhibited.

In addition, the present invention can be applied to any postcard and document as well the document, the copy of which must be inhibited.

The present invention may be applied to a system composed of a plurality of apparatuses or a system composed of one apparatus. The present invention may, of course, be applied to a case which is established by supplying a program to the system or an apparatus.

Although in each of the aforesaid embodiments yellow is used as the added color, the present invention is not limited to this. For example, a quiet color such as yellow green or gray or a color having a high brightness such as purple or light green may be employed.

Although in each of the aforementioned embodiments the image of the original document is inputted, the present invention is not limited to this. The original document may be that input by a still video camera or a video camera and the original document may be that processed according to the computer graphics.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An image processing apparatus comprising:
   input means for inputting image data;
   process means for processing the image data and generating processed image data;
   outputting means for outputting an image in units of a predetermined block having a plurality of pixels, based on the processed image data;
   discriminating means for discriminating whether or not an image represented by the image data is a predetermined image; and
   delay means for delaying the outputting of the image represented by the processed image data during the discrimination by said discriminating means,
   wherein said discrimination means is capable of performing the discrimination in units of the predetermined block.

2. The apparatus according to claim 1, wherein said delay means delays the processed image data in units of the predetermined block.

3. The apparatus according to claim 1, wherein the processed image data comprises a plurality of color components, and said outputting means outputs a color image in units of the predetermined block.

4. The apparatus according to claim 1, wherein said outputting means comprises an ink-jet printhead.

5. The apparatus according to claim 4, wherein the size of the predetermined block corresponds to a printing area of the ink-jet printhead per one scan.

6. The apparatus according to claim 1, wherein said discriminating means discriminates the predetermined image by using a color characteristic of the predetermined image.

7. The apparatus according to claim 1, wherein said input means includes an image scanner for scanning an original, and for generating multi-level image data.

8. An image processing apparatus comprising:
   input means for inputting image data;
   process means for processing the image data and for generating processed image data;
   output means for outputting the processed image data in units of a predetermined block having a plurality of pixels, to a printing device which forms an image based on the processed image data by serially scanning a printhead;
   discriminating means for discriminating whether or not an image represented by the image data is a predetermined image; and delay means for delaying the outputting of the processed image data during the discrimination by said discriminating means,
wherein said delay means compensates a fluctuation of an operation of the printhead in connection with the outputting of the processed image data to the printing device.

9. An image processing method comprising the steps of:

inputting image data;

processing the image data and generating processed image data;

outputting an image in units of a predetermined block having a plurality of pixels, based on the processed image data;

discriminating whether or not an image represented by the image data is a predetermined image; and delaying the outputting of the image represented by the processed image data during the discrimination in said discriminating step, wherein said discriminating step is capable of performing the discrimination in units of the predetermined block.

10. An image processing method comprising the steps of:

inputting image data;

processing the image data and generating processed image data;

outputting the processed image data in units of a predetermined block having a plurality of pixels, to a printing device which forms an image based on the processed image data by serially scanning a printhead;

discriminating whether or not an image represented by the image data is a predetermined image; and delaying the outputting of the processed image data during the discrimination in said discriminating step,
wherein said delaying step compensates a fluctuation of an operation of the printhead in connection with the outputting of the processed image data to the printing device.

* * * * *

UNITED STATES PATENT AND TRADEMARK OFFICE
CERTIFICATE OF CORRECTION

PATENT NO. : 5,790,932

DATED : August 4, 1998

INVENTOR(S) : YOSHIO KOMAKI, ET AL.

It is certified that error appears in the above-identified patent and that said Letters Patent is hereby corrected as shown below:

On the title page, item [54] and Column 1, line 3:

"DATA WHETHER" should read --DATA WHILE DETERMINING WHETHER--.

item [56] REFERENCE CITED

FOREIGN PATENT DOCUMENTS

"65-59936" should read --54-59936--.

In the Drawings:
SHEET 19

FIG. 24

"PROTION" should read --PORTION-- in block 308.

COLUMN 1

Line 3, "DATA" should read --DATA WHILE DETERMINING--.
Line 22, "while" should be deleted.
Line 28, "the" should read --such--.
Line 32, "Then," should read --A--.

UNITED STATES PATENT AND TRADEMARK OFFICE
CERTIFICATE OF CORRECTION

PATENT NO. : 5,790,932

DATED : August 4, 1998

INVENTOR(S) : YOSHIO KOMAKI, ET AL.

It is certified that error appears in the above-identified patent and that said Letters Patent is hereby corrected as shown below:

COLUMN 1

Line 48, "informs" should read --informs a viewer--.
Line 54, "already" should read --already,--.
Line 55, "undesirably," should read --and undesirably been--.
Line 56, "is," should read --is--.
Line 61, "the" (second occurrence) should read --a--, and "a" should be deleted.

COLUMN 2

Line 22, "to" (second occurrence) should be deleted.
Line 23, "provide" should read --provided--.
Line 31, "to" (second occurrence) should be deleted.
Line 32, "provide" should read --provided--.
Line 51, "10shown" should read --10 shown--.

COLUMN 3

Line 45, "Preferred" should read --The preferred--.
Line 57, "reader portion" should read --"reader portion")--.

UNITED STATES PATENT AND TRADEMARK OFFICE
CERTIFICATE OF CORRECTION

PATENT NO. : 5,790,932

DATED : August 4, 1998

INVENTOR(S): YOSHIO KOMAKI, ET AL.

It is certified that error appears in the above-identified patent and that said Letters Patent is hereby corrected as shown below:

COLUMN 4

Line 51, "or" should read --or a--.
    Line 61, "i.e. " should read --i.e.,--.

COLUMN 5

Line 25, "paper," should read --paper--.
    Line 26, "manually," should read --manually--.
    Line 39, "a paper" should read --paper, a--.
    Line 63, "perpendicularly" should read --perpendicular--.

COLUMN 6

Line 3, "return scan" should read --return-scan--.

COLUMN 7

Line 44, "of the nozzle in" should read --in the nozzle of--.

COLUMN 10

Line 21, "making" should read --make--.
    Line 22, "Next" should read --Next, --
    Line 25, "Next "should read --Next, --

UNITED STATES PATENT AND TRADEMARK OFFICE
CERTIFICATE OF CORRECTION

PATENT NO. : 5,790,932

DATED : August 4, 1998

INVENTOR(S) : YOSHIO KOMAKI, ET AL.

It is certified that error appears in the above-identified patent and that said Letters Patent is hereby corrected as shown below:

COLUMN 11

Line 25, "similarly" should read --similar--.
    Line 40, "move" should read --moved--.
    Line 58, "a" should read --an--.

COLUMN 13

Line 39, "half tone" should read --half-tone--.

COLUMN 15

Line 17, "signals" should read --signals,--, and Line 16, "way" should read --way,--.

COLUMN 16

Line 55, "signals" should read --signal--.

COLUMN 17

Line 2, "having" should read --having a--.

COLUMN 18

Line 35, "machining" should read --machine--.

UNITED STATES PATENT AND TRADEMARK OFFICE
CERTIFICATE OF CORRECTION

PATENT NO. : 5,790,932

DATED : August 4, 1998

INVENTOR(S) : YOSHIO KOMAKI, ET AL.

It is certified that error appears in the above-identified patent and that said Letters Patent is hereby corrected as shown below:

COLUMN 19

Line 49, "by" should read --be--.
    Line 56, "number." should read --number is not limited--.
    Line 63, "the document," should read --a document--.

Signed and Sealed this

Seventeenth Day of August, 1999

Attest:

Q. TODD DICKINSON

*Attesting Officer*      *Acting Commissioner of Patents and Trademarks*